(12) United States Patent
Shan et al.

(10) Patent No.: US 9,485,424 B2
(45) Date of Patent: **\*Nov. 1, 2016**

(54) IMAGE PROCESSING SYSTEM AND METHOD USING SERIALLY COUPLED CAMERAS FOR PROVIDING EXTENDED VIEW

(71) Applicant: OmniVision Technologies, Inc., Santa Clara, CA (US)

(72) Inventors: Jizhang Shan, Los Gatos, CA (US); Weihua Xiong, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,414

(22) Filed: Aug. 31, 2015

(65) Prior Publication Data

US 2015/0373270 A1    Dec. 24, 2015

Related U.S. Application Data

(63) Continuation of application No. 13/559,257, filed on Jul. 26, 2012, now Pat. No. 9,124,801.

(51) Int. Cl.
*H04N 5/238* (2006.01)
*H04N 5/232* (2006.01)
*H04N 5/225* (2006.01)
(Continued)

(52) U.S. Cl.
CPC ........... *H04N 5/23238* (2013.01); *G06T 11/60* (2013.01); *H04N 5/2258* (2013.01); *H04N 5/2628* (2013.01); *H04N 7/181* (2013.01); *H04N 5/253* (2013.01)

(58) Field of Classification Search
USPC ....................................................... 348/159
See application file for complete search history.

(56) References Cited

U.S. PATENT DOCUMENTS 5,465,160 A    11/1995  Kamo et al.
6,061,089 A *   5/2000  Tonkin ................... H04N 7/181
                                                348/211.6
(Continued)

FOREIGN PATENT DOCUMENTS

CN       1543194 A       11/2004
CN       101577795       11/2009
(Continued)

OTHER PUBLICATIONS

Taiwanese Application 102127004 Office Action dated Feb. 3, 2015, 8 pages.

(Continued)

*Primary Examiner* — Paulos M Natnael
(74) *Attorney, Agent, or Firm* — Lathrop & Gage LLP

(57) ABSTRACT

A system and method for generating an image includes a plurality of imaging units coupled together and a system controller coupled to the plurality of imaging units for providing at least one signal to each of the plurality of imaging units. Each of the imaging units comprises: an image sensing unit for generating an in-situ image, each in-situ image being a portion of the image; an input for receiving the in-situ image; a composition unit for receiving a first composite image and producing a second composite image, the second composite image being a combination of the first composite image and the in-situ image; and an output at which the second composite image is provided.

16 Claims, 24 Drawing Sheets

(51) Int. Cl.
*H04N 5/262* (2006.01)
*G06T 11/60* (2006.01)
*H04N 7/18* (2006.01)
*H04N 5/253* (2006.01)

(56) References Cited

U.S. PATENT DOCUMENTS

| | | | |
|---|---|---|---|
| 6,348,858 B2* | 2/2002 | Weis | B60R 1/00 340/435 |
| 7,782,374 B2 | 8/2010 | Suzuki et al. | |
| 8,269,837 B2 | 9/2012 | Shirakawa et al. | |
| 8,384,782 B2 | 2/2013 | Hiroshi | |
| 8,760,515 B2 | 6/2014 | Abe et al. | |
| 8,855,404 B2 | 10/2014 | Doyle et al. | |
| 2001/0052845 A1* | 12/2001 | Weis | B60R 1/00 340/436 |
| 2004/0218052 A1* | 11/2004 | DiDomenico | G08G 1/054 348/207.99 |
| 2007/0097224 A1* | 5/2007 | Haneda | H04N 13/0239 348/221.1 |
| 2009/0040293 A1 | 2/2009 | Foo et al. | |
| 2009/0123022 A1* | 5/2009 | Derrenberger | G06T 1/0085 382/100 |
| 2010/0111489 A1* | 5/2010 | Presler | H04N 5/225 386/278 |
| 2010/0295961 A1 | 11/2010 | Terauchi | |
| 2011/0157361 A1* | 6/2011 | Wu | G06T 3/4038 348/148 |
| 2011/0193980 A1* | 8/2011 | Ogasawara | H04N 1/387 348/220.1 |
| 2011/0261192 A1 | 10/2011 | Kim | |
| 2012/0013776 A1 | 1/2012 | Tsou et al. | |
| 2012/0314048 A1 | 12/2012 | Matos | |
| 2014/0079397 A1* | 3/2014 | Beach | H04L 12/40045 398/67 |

FOREIGN PATENT DOCUMENTS

| | | |
|---|---|---|
| TW | I332197 | 10/2010 |
| TW | I335485 | 1/2011 |
| TW | I344788 | 7/2011 |

OTHER PUBLICATIONS

English translation of the First Office Action corresponding to Chinese Patent Application No. 201310319912.0, mailed May 3, 2016, 8 pages.

English translation of the First Office Action corresponding to Taiwanese Patent Application No. 104135938, mailed May 25, 2016, 2 pages.

* cited by examiner

Real Object
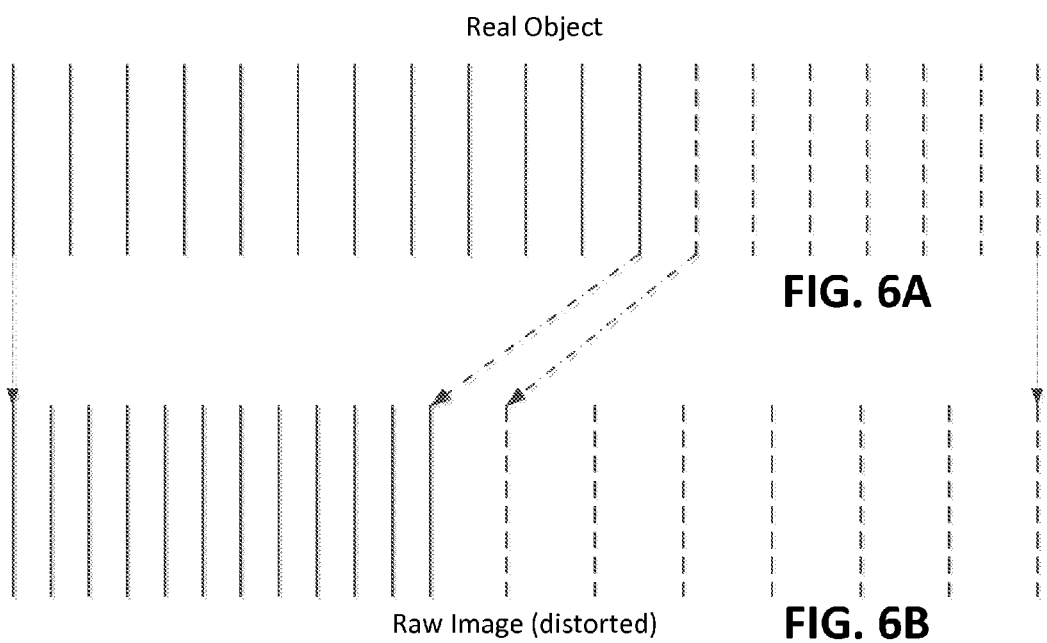
FIG. 6A
Raw Image (distorted) FIG. 6B
Distortion Corrective Sampling
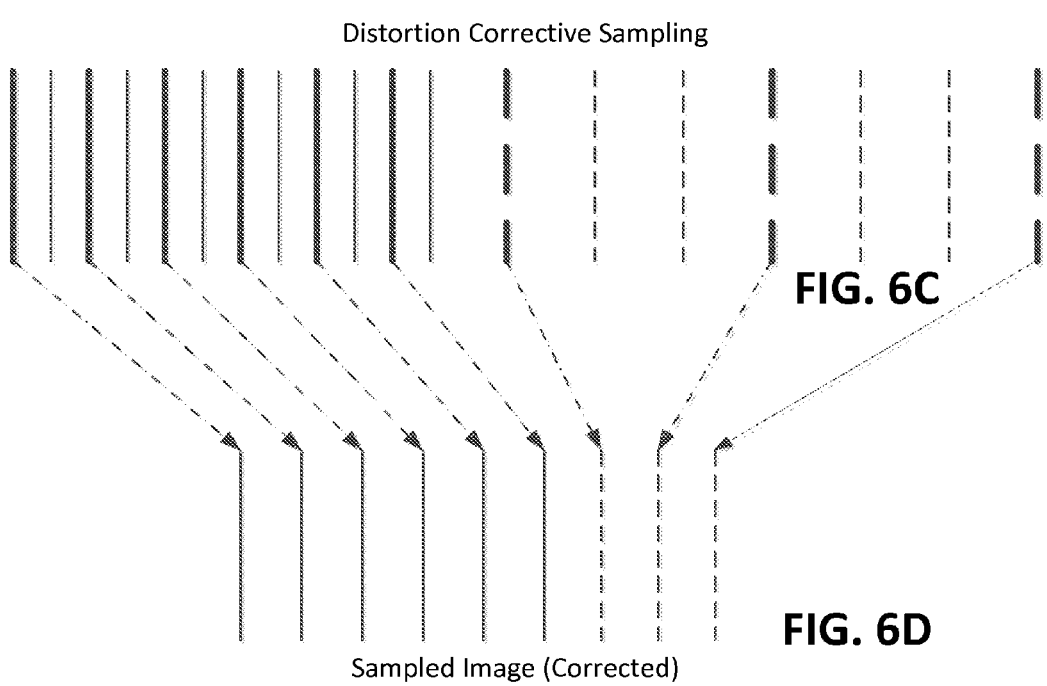
FIG. 6C
FIG. 6D
Sampled Image (Corrected)

IMAGE PROCESSING SYSTEM AND METHOD USING SERIALLY COUPLED CAMERAS FOR PROVIDING EXTENDED VIEW

CROSS-REFERENCE TO RELATED APPLICATIONS

The present application is a continuation application of U.S. application Ser. No. 13/559,257 filed Jul. 26, 2012, which is incorporated herein by reference in its entirety.

BACKGROUND

1. Technical Field

This disclosure relates to image processing systems and methods and, more particularly, to image processing systems and methods which provide a composite view or image that is extended beyond what a single imager may provide.

2. Discussion of Related Art

There are many applications in which it is desirable to use multiple cameras or imagers to create an image of an object or a scene. For example, in an automobile "surround view" system, multiple, e.g., four, cameras can be used simultaneously to create an image of the area surrounding the automobile. In such systems, each of the multiple cameras provides an image of a portion of the surrounding area. Each camera forwards its image data to a "stitching processor" which stitches the individual images together to create a composite image.

FIG. 1 contains a schematic functional block diagram of a conventional imaging system 10, which generates a composite image of a scene using four cameras or imagers 12. In the conventional system 10, the imagers 12 interface with a single stitching processor 20 in parallel. That is, each of the fours imagers 12 interfaces directly with the single central stitching processor 20 to forward its respective image data, i.e., Image 1, Image 2, Image 3 and Image 4, to the stitching processor 20. The stitching processor 20 gathers and stores the data from all of the imagers 12 and stitches the data together to form the composite image for presentation on the display 22.

In such systems, the hardware configuration is necessarily fixed to accommodate the number of imagers 12. For example, the stitching processor 20 typically includes an input buffer for each camera or imager 12, a central processing unit (CPU) to control data flow and elements in the stitching processor 20, an image conversion unit, a table memory which includes an address conversion table for converting the individual images to the composite image, an output buffer, and an internal bus for transmission of data and control signals. All of these hardware elements are fixed and dedicated based on the number of imagers 12 connected to the stitching processor 20 and being used to generate the composite image. That is, the hardware elements are designed to handle a fixed number of camera data feeds. As a result, the conventional system 10 lacks flexibility in, for example, changing the number of cameras 12 being used to form the composite image. If the number of cameras 12 needs to be changed, by either adding or removing one or more cameras 12, a redesign of these hardware elements is required. This redesign is very costly and time consuming.

SUMMARY

According to one aspect, an imaging system for generating an image is provided. The imaging system includes a plurality of imaging units coupled together and a system controller coupled to the plurality of imaging units for providing at least one signal to each of the plurality of imaging units. Each of the imaging units comprises: an image sensing unit for generating an in-situ image, each in-situ image being a portion of the image; a first input for receiving the in-situ image; a composition unit for receiving a first composite image and producing a second composite image, the second composite image being a combination of the first composite image and the in-situ image; and an output at which the second composite image is provided.

According to another aspect, an imaging unit of an imaging system for creating an image is provided. The imaging unit comprises: an image sensing unit for generating an in-situ image, each in-situ image being a portion of the image; a first input for receiving the in-situ image; a composition unit for receiving a first composite image and producing a second composite image, the second composite image being a combination of the first composite image and the in-situ image; and an output at which the second composite image is provided.

According to another aspect, a method for generating an image is provided. The method includes: coupling a plurality of imaging units together; coupling a system controller to the plurality of imaging units for providing at least one signal to each of the plurality of imaging units; and, in each of the imaging units: generating an in-situ image, each in-situ image being a portion of the image; receiving a first composite image; generating a second composite image by combining the first composite image and the in-situ image; and providing the second composite image as an output.

BRIEF DESCRIPTION OF THE DRAWINGS

The foregoing and other features and advantages will be apparent from the more particular description of preferred embodiments, as illustrated in the accompanying drawings in which like reference characters refer to the same parts throughout the different views. The drawings are not necessarily to scale. In the drawings, the sizes of features may be exaggerated for clarity.

FIGS. 6A-6D are schematic diagrams illustrating a sampling operation used to correct image distortion in an in-situ image, according to some exemplary embodiments.

DETAILED DESCRIPTION

Figure 1:
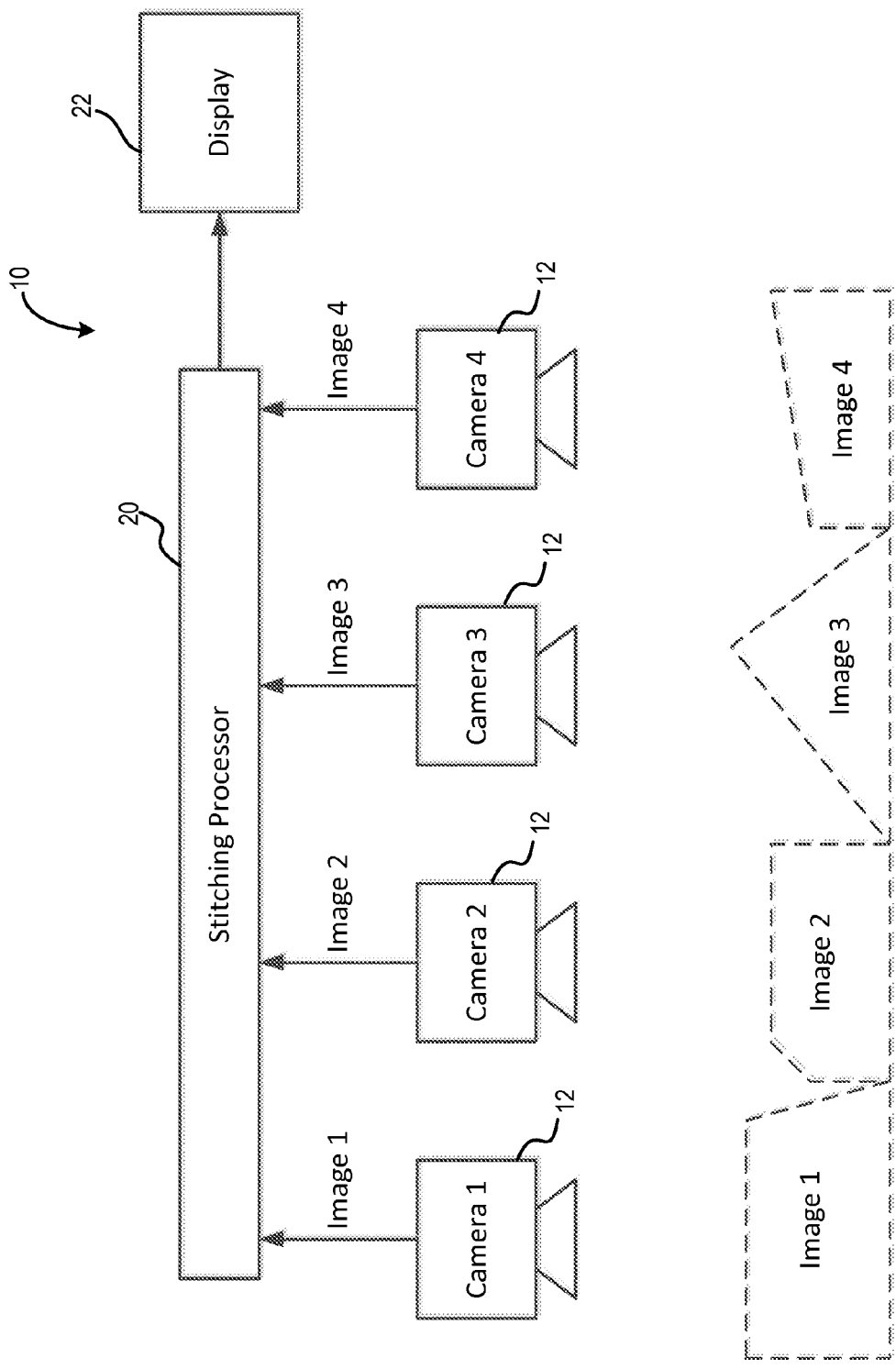
FIG. 1 contains a schematic functional block diagram of a conventional imaging system, which generates a composite image of a scene using four cameras or imagers.
Figure 2:
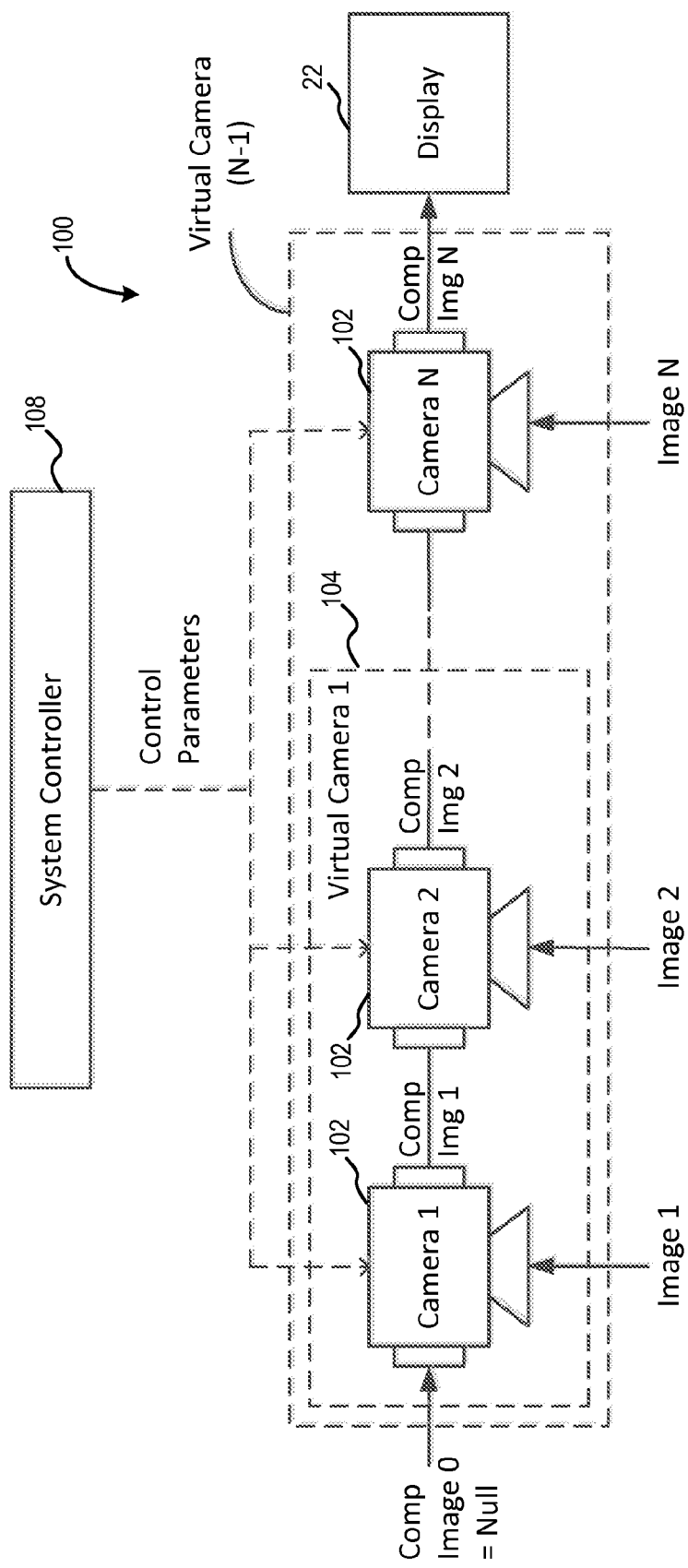
FIG. 2 contains a schematic functional block diagram of an imaging system, according to some exemplary embodiments.

FIG. 2 contains a schematic functional block diagram of an imaging system 100 according to some exemplary embodiments. Referring to FIG. 2, a plurality of imagers or cameras 102, also referred to herein as Camera 1, Camera 2, . . . , Camera N, are connected in series, i.e., in a serial chain. Each camera 102 is connected to a common system controller 108. System controller 108 exercises control over each camera or imager 102 individually by sending control parameters to individual cameras 102.

According to exemplary embodiments, a composite image is generated in stages. Each imager or camera 102 serves as a single stage in the generation of the image. Each imager or camera 102 generates its own local or in-situ image with its own imaging element, for example, a CMOS or CCD image sensor. With one exception, each camera or imager 102 also receives a composite image from the immediately preceding-stage ('upstream") camera or imager 102, the exception being the first-stage camera or imager 102, which either receives a null composite image or internally generates a null composite image. The null composite image received or generated by the first-stage camera or imager 102 can be an image of all data zeroes or unknown/irrelevant data.

Each camera or imager 102 processes its in-situ image based on instructions received from the system controller 108. Each camera or imager 102 stitches together its processed in-situ image and the composite image received from the upstream camera or imager 102, or, in the case of the first-stage camera or imager 102, the null composite image, to generate a new or revised composite image. The camera or imager 102 then passes the new composite image to the next camera or imager 102 "downstream" in the series of cameras 102. The final camera or imager 102 in the chain outputs the final composite image for display, storage and/or other function.

A desirable aspect of the system 100 of the present disclosure is its flexibility in scaling the size of the system 100, that is, the number of imagers or cameras 102 being used to generate the final composite image. According to the system 100 of the present disclosure, imagers or cameras 102 may be added or removed easily, depending on the scenarios for the final composite image, e.g., panoramic, peripheral, multiple locations, etc.

Specifically, referring to FIG. 2, Camera 1 produces composite image 1 (Comp Img 1). To generated Comp Img 1, Camera 1 either receives or generates by itself an empty or "null" composite image 0. Camera 1 also produces an in-situ image, referred to as Image 1, with its own imaging element, e.g., a CMOS or CCD image sensor. Camera 1 processes or manipulates its in-situ Image 1 and stitches it onto the composite image 0 to produce composite image 1. Control parameters, also referred to herein as calibration parameters, used for the processing/manipulation and stitching are received by Camera 1 from system controller 108. Camera 1 outputs composite image 1 to downstream Camera 2.

Camera 2 produces composite image 2 (Comp Img 2). Camera 2 receives composite image 1 from upstream Camera 1. Camera 2 produces an in-situ Image 2 with its own imaging elements, e.g. CMOS or CCD image sensor. Camera 2 processes or manipulates in-situ Image 2 and stitches it onto the composite image 1 to produce composite image 2. Composite Image 2 is essentially the sum of processed in-situ Image 1 and processed in-situ Image 2, i.e., Composite Image 2=Image 1+Image 2. As in the case of Camera 1, Camera 2 receives the required control parameters or calibration parameters from system controller 108. Camera 2 outputs composite image 2.

The combination of Camera 1 and Camera 2 can be viewed as a single virtual camera. For example, the single virtual camera, referred to herein as Virtual Camera 1 and identified by reference numeral 104, produces composite image 2 and forwards composite image 2 downstream to the next camera 102 in the serial chain of cameras 102. This operation repeats down the serial chain of imagers or cameras 102. The final camera N similarly produces the final composite image N, and sends it to display 22, for example. The final composite image N is essentially the stitched sum of the processed in-situ images, i.e., Image 1+Image 2+ . . . + image N. The combination of Camera 1, Camera 2, . . . , Camera N can be viewed a single virtual camera, namely, Virtual Camera N−1, which produces the final composite image N.

Thus, according to some exemplary embodiments, the stitching operation is performed within each camera 102, one camera at a time. A series or serial chain of cameras 102 accomplishes the overall stitching operation in a series of multiple steps. Individual in-situ images are produced and modified or processed as desired and then added, one at a time, in stages, to an evolving composite image. System controller 108 controls each camera 102 in the serial chain as to how each in-situ image is to be manipulated or processed and how the modified/processed images are to be stitched together to form the composite image in stages.

Figure 3A:
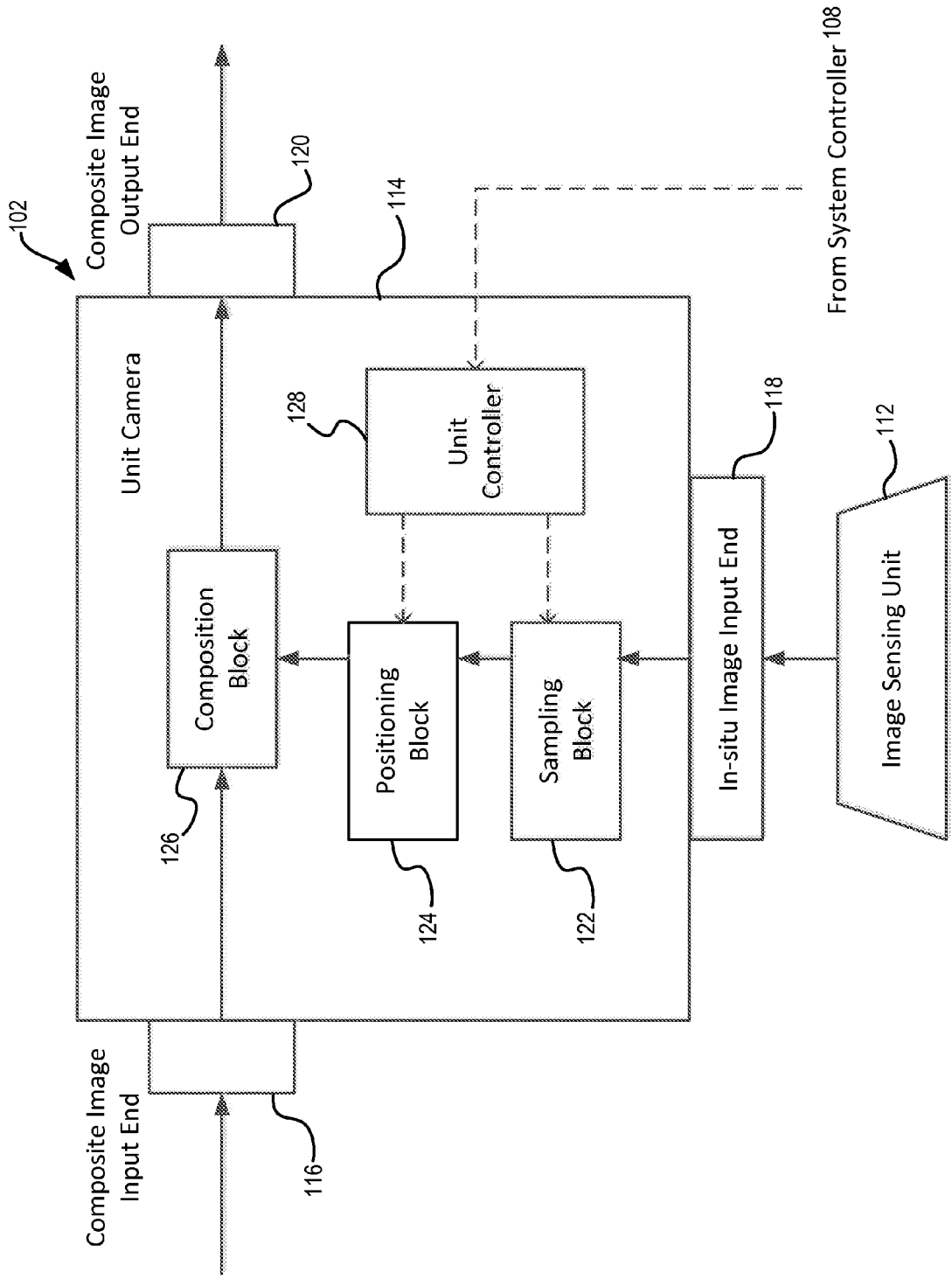
FIGS. 3A and 3B are schematic functional block diagrams of one of the imagers or cameras illustrated in FIG. 2, according to some exemplary embodiments.
Figure 3B:
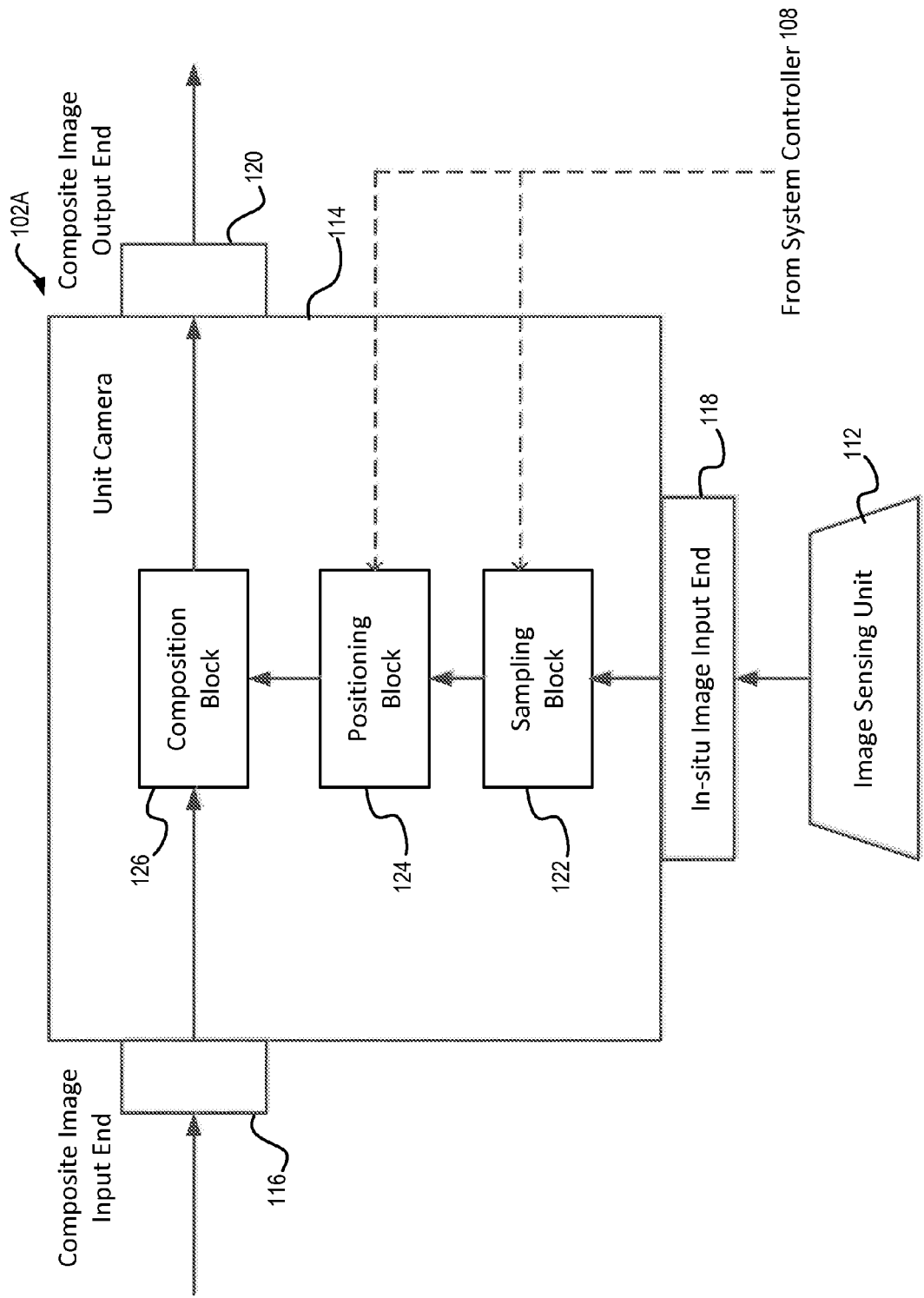

FIGS. 3A and 3B are schematic functional block diagrams of one of the imagers or cameras 102 illustrated in FIG. 2, according to some exemplary embodiments. Referring to FIGS. 3A and 3B, camera 102 includes an image sensing unit or image sensor 112, which can be, in some exemplary embodiments, a CMOS image sensor. In some exemplary embodiments, image sensor 112 can be a CCD image sensor.

Imager or camera 102 can also include a data processing unit 114, which processes image data as required for camera 102. Data processing unit 114 includes input-output ends which receive and transmit signals as appropriate. Specifically, data processing unit 114 includes a composite image input end 116, which receives the composite image from the immediately previous "upstream" camera 102. As noted above, if camera 102 is the first camera in the serial chain of cameras, then the composite image received at composite image input end 116 is data for a "null" image. Alternative, the null composite image for the first camera 102 in the serial chain of cameras 102 can also be generated internally by data processing unit 114 instead of received at the composite image input end 116. Data processing unit 114 also includes an in-situ image input end 118, which receives the data for the in-situ image from image sensing unit 112. Data processing unit 114 also includes a composite image output end 120 at which the composite image generated by data processing unit 114 is transmitted to the next "downstream" camera 102. Alternatively, if camera 102 is the last camera 102 in the serial chain of cameras, then the final composite image can be transmitted via composite image output end 120 for display, storage, or other operation appropriate for the final composite image.

Data processing unit 114 also includes data processing components, which, in some embodiments, can include a sampling block 122, a positioning block 124 and a composition block 126. Sampling block 122 receives data for the in-situ image from in-situ image input end 118 and manipulates or processes the data by selective sampling of the data to generate sampled image data for a sampled image. The sampling of data carried out by sampling block 122 can be used to correct the in-situ image for such artifacts as offset, distortion, slanting or other such image feature requiring correction. Positioning block 124 receives the sampled image data from sampling block 122 and manipulates or processes the sampled image data to effect various operations. For example, positioning block 124 can manipulate or process the sampled image data to rotate the sampled image to an appropriate orientation. Also, positioning block 124 assigns the position of the sampled image within the composite image such that subsequent stitching of the sampled image into the composite image is carried out with the sampled image being stitched into the correct position in the composite image.

In some exemplary embodiments, as illustrated in FIG. 3A, data processing unit 114 also includes a unit controller 128, which exercises control over sampling block 122 and positioning block 124. Unit controller 128 receives calibration parameters from system controller 108 (see FIG. 2). The control signals are represented by dashed lines in FIG. 3A. The control signals are transmitted to their appropriate destinations, i.e., sampling block 122, positioning block 124, etc., by unit controller 128.

Referring to FIG. 3B, in an alternative embodiment of camera 102A, system controller 108 may exercise control over sampling block 122 and positioning block 124 directly, without the need for unit controller 128. That is, in some exemplary embodiments, as illustrated in camera 102A of FIG. 3B, unit controller 128 is not used. It should be noted that, with the exception of unit controller 128, the entire description herein referring to imager or camera 102 is also applicable to imager or camera 102A illustrated in FIG. 3B.

Referring to FIGS. 3A and 3B, image data processing unit 114 can also include composition block 126. Composition block 126 receives or imports a composite image from a previous or "upstream" imager or camera 102, or, in the case of the first camera 102, a null composite image, via composite image input end 116. Composition block 126 inserts or stitches the processed sampled image into the received composite image to produce an updated composite image. Composition block 126 then sends or exports the updated composite image to the next downstream imager or camera 102 via composite image output end 120.

Figure 4A:
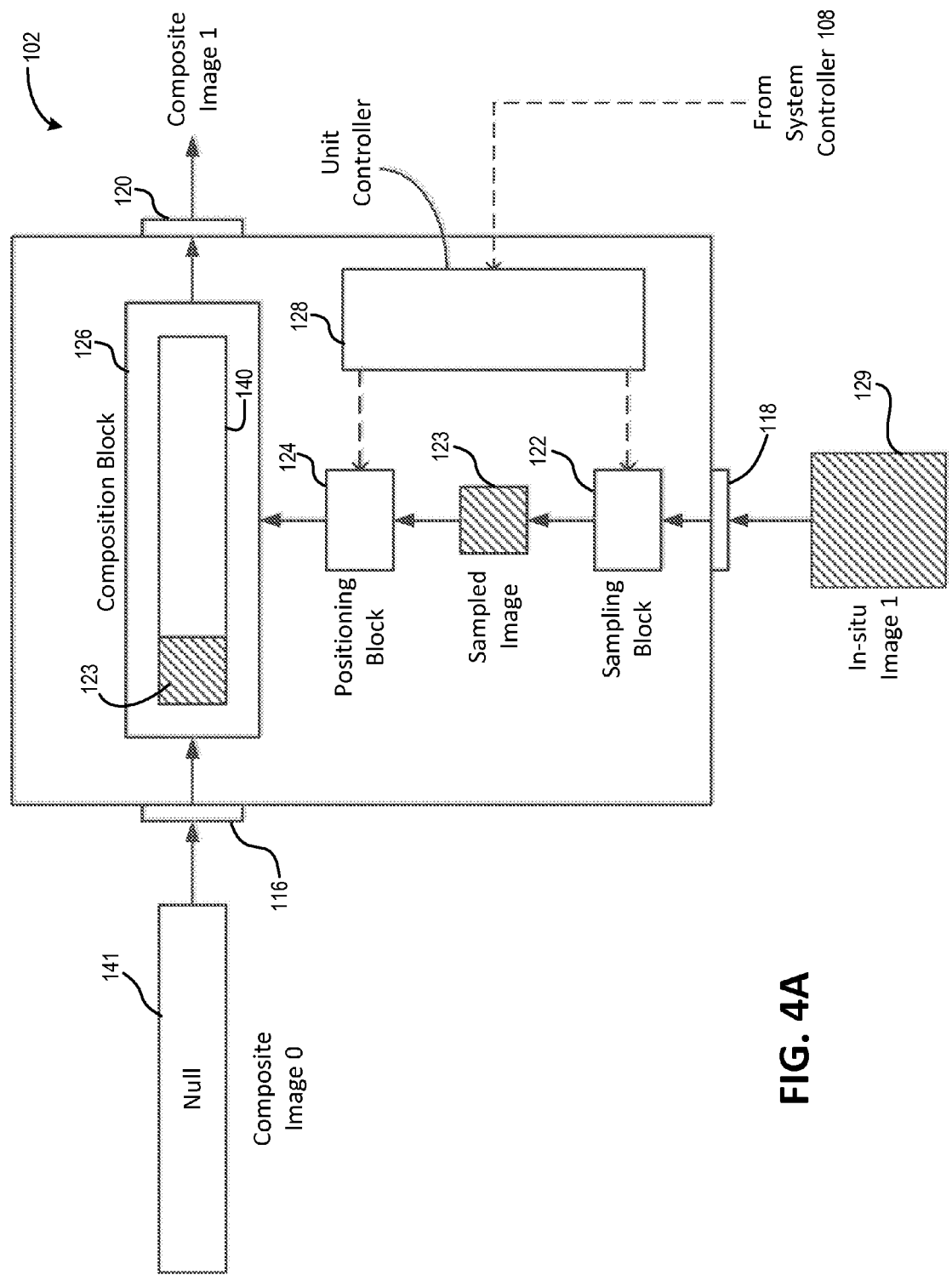
FIGS. 4A-4C contain schematic diagrams illustrating a process of producing a panoramic composite image using multiple imagers or cameras, according to some exemplary embodiments.
Figure 4B:
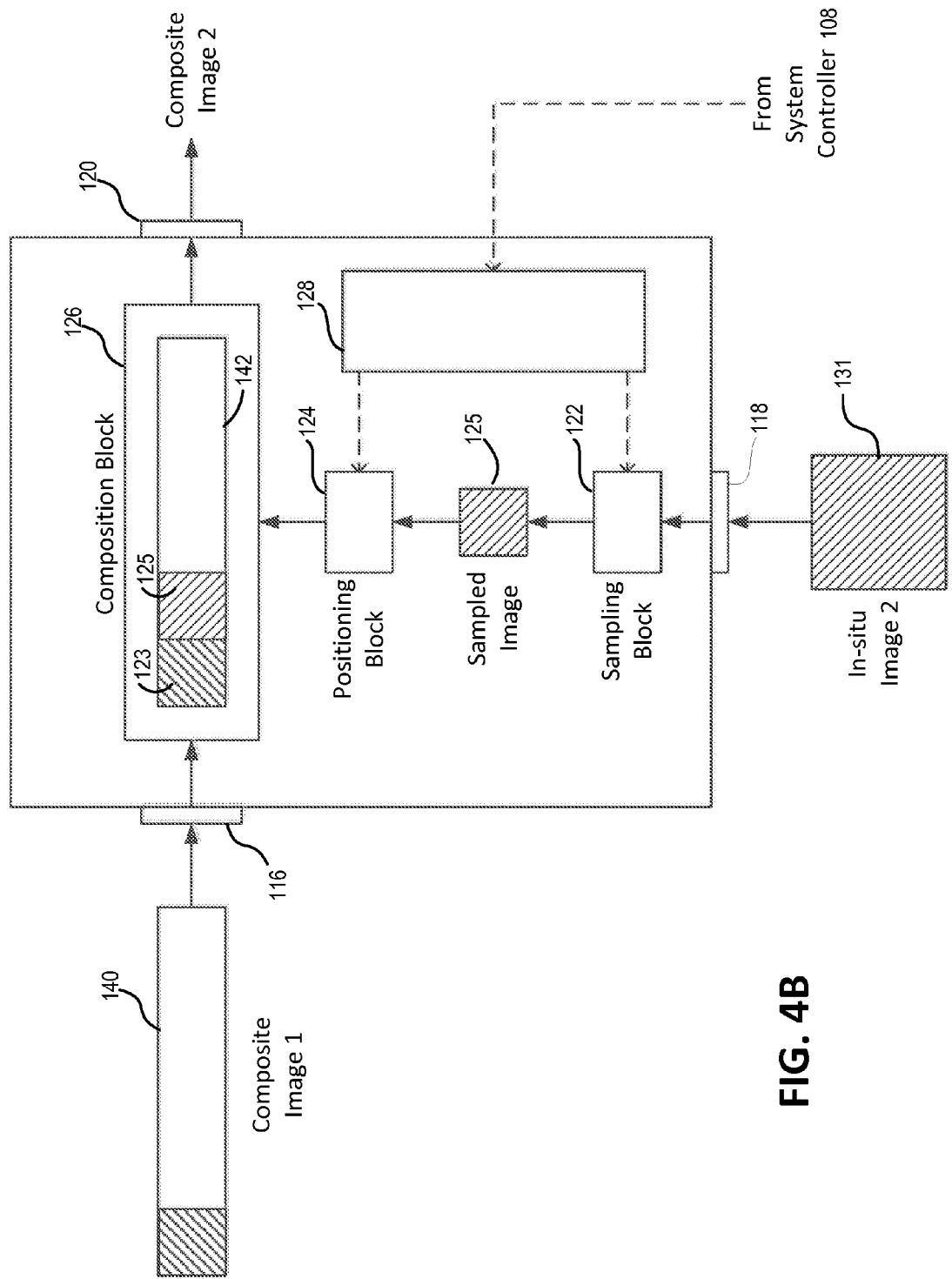
Figure 4C:
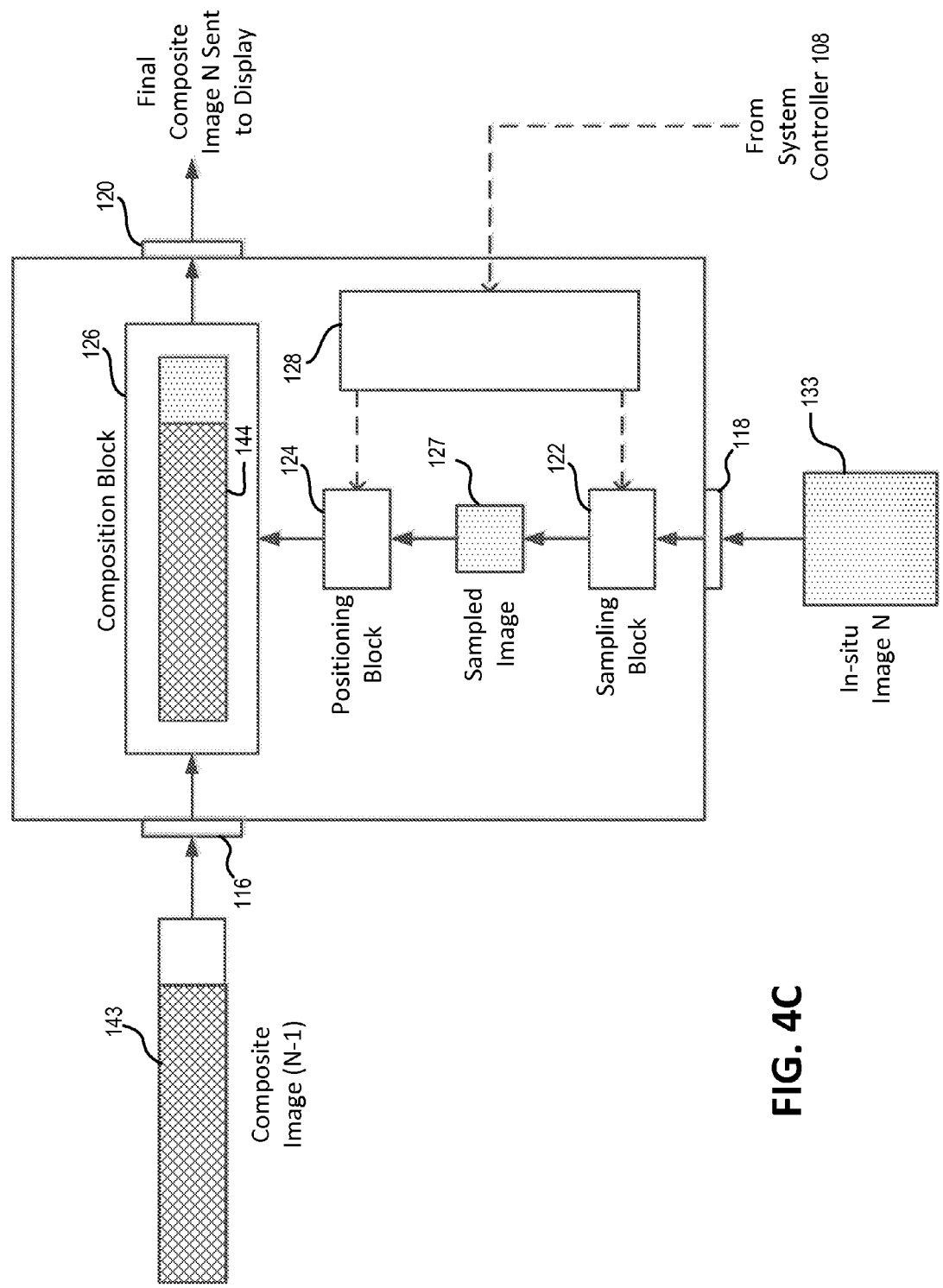

FIGS. 4A-4C contain schematic diagrams illustrating a process of producing a panoramic composite image using multiple imagers or cameras 102, according to some exemplary embodiments. Referring to FIG. 4A, the first-stage imager or camera 102 is illustrated. Image sensing unit 112 (not shown) creates an in-situ image 129, referred to as In-situ Image 1, which is received at in-situ image input end 118. In-situ image 129 is transferred to Sampling Block 122, which samples in-situ image 129 to produce sampled image 123. The sampling of in-situ image 129 is performed by Sampling Block 122 according to instructions received from unit controller 128. Unit controller 128 transmits appropriate control signals, such as sampling instructions, according to calibration parameters it receives form system controller 108.

The sampled image 123 is a representation of In-situ Image 1. Under normal circumstances, i.e., circumstances in which no correction of In-situ Image 1 is required, the representative sampled image 123 is obtained without need to correct for image artifacts, such as offset, distortion, slanting, etc. For example, under normal circumstances, in one particular exemplary embodiment, Sampling Block 122 might read every other row of the in-situ image data and discard all the other rows. It also might read every other column of the in-situ image data and discard all the other columns. In this exemplary illustration, the result is sampled image 123 which is ¼ the size of in-situ image 129, with ¼ the resolution, which is representative of the entire in-situ image 129.

There are various approaches to sampling in-situ image 129 which may be taken to implement corrections of various undesirable artifacts in in-situ image 129. For example, cropping and selective sampling, in which certain portions of in-situ image 129 are not sampled and are, as a result, omitted from sampled image 123, as well as coordinate conversion, may be carried out. As described below in detail, these variations on sampling may be performed to correct for artifacts such as distortion, slanting and offset. The sampling operation performed in Sampling Block 122 may reduce image resolution, or may crop, warp and/or rotate in-situ image 129.

Positioning block 124 assigns to sampled image 123 a position within the composite image being generated. The positioning of sampled image 123 is based on positioning instructions received from unit controller 128. Unit controller 128 transmits appropriate control signals, such as positioning instructions, according to calibration parameters it receives from system controller 108. In the particular exemplary illustration of FIG. 4A, sampled image 123 is to be placed at the extreme left end of the composite image 140.

Composition block 126 produces updated composite image 140. Composition block 126 receives a composite image 141 via composite image input end 116. In this case, i.e., in the case of the first-stage camera 102, composite image 141 is a null image. As noted above, null composite image 141 may alternatively be generated within camera 102 rather than being generated externally. Composition block 126 inserts the processed sampled image 123 into null composite image 141 to produce updated composite image 140. Composition block 126 then exports composite image 140 to the next downstream camera 102 via composite image output end 120.

Referring to FIG. 4B, a next or intermediate imager or camera 102 in the serial chain of imagers or cameras is illustrated. Composite image 140, generated in the previous upstream camera 102, is received at composite image input end 116. In-situ image 131, also referred to as In-situ Image 2, is also generated by local camera 102. In-situ image 131 is sampled by Sampling Block 122 to produce sampled image 125. Positioning block 124 positions sampled image 125 in composite image 142. In this particular exemplary illustration, sampled image 125 is to be placed in composite image 142 immediately to the right of sampled image 123. Composition block 126 inserts processed sampled image 125 into composite image 140 to generate composite image 142, and exports composite image 142 to the next downstream camera 102 via composite image output end 120.

This process continues from stage to stage, until the final-stage, also referred to as N-stage, imager or camera 102 is reached. FIG. 4C illustrates the final-stage or N-stage imager or camera 102. Referring to FIG. 4C, N-stage camera 102 receives the N−1 composite image 143 from the upstream N−1 camera 102, at composite image input end 116. N-stage camera 102 also produces an N-stage in-situ image 133, also referred to herein as In-situ Image N. Sampling block 122 samples in-situ image 133 to generate N-stage sampled image 127. Positioning block 124 positions processed sampled image 127 in final composite image 144. In this exemplary illustration, sampled image 127 is to be positioned at the far right end of final composite image 144. Composition block 126 inserts processed sampled image 127 into composite image (N−1) 143 to generate final composite image 144. Composition block 126 exports final composite image 144 for storage or display via composite image output end 120.

The approach to generating a composite image described in detail above is used generally to create the composite image according to the disclosure, from in-situ images that do not suffer from artifacts such as offset, distortion, and slanting. As a result, the sampling and positioning operations described above do not include any provisions for correcting for any image artifacts. However, according to the present disclosure, as set forth below in detail, various embodiments of sampling and/or positioning may be used as part of the generation of a composite image described in detail above, as appropriate to process in-situ images into sampled and/or repositioned images to correct for artifacts such as offset, distortion, and slanting.

Figure 5A:
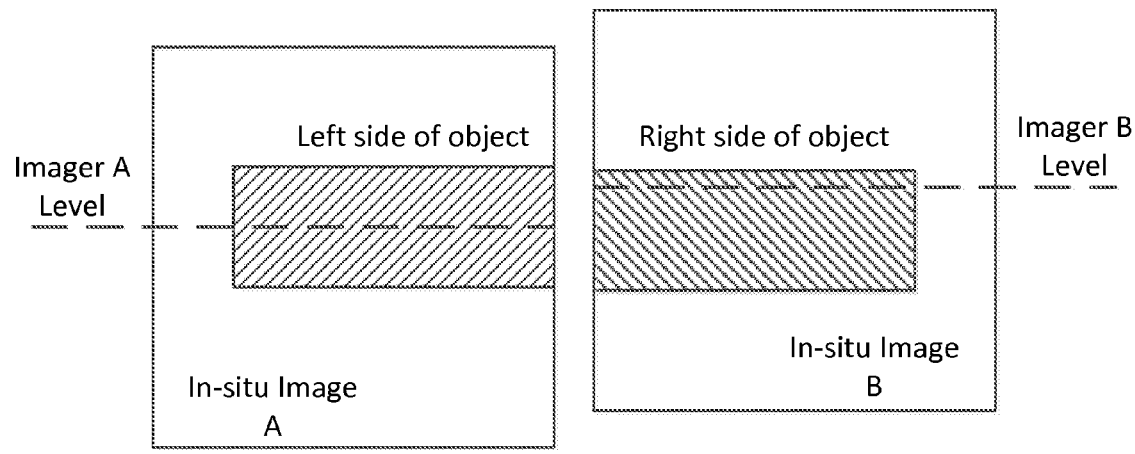
FIGS. 5A-5B are schematic diagrams illustrating a sampling operation used to crop an in-situ image to eliminate an offset artifact in the in-situ image, in accordance with some exemplary embodiments.
Figure 5B:
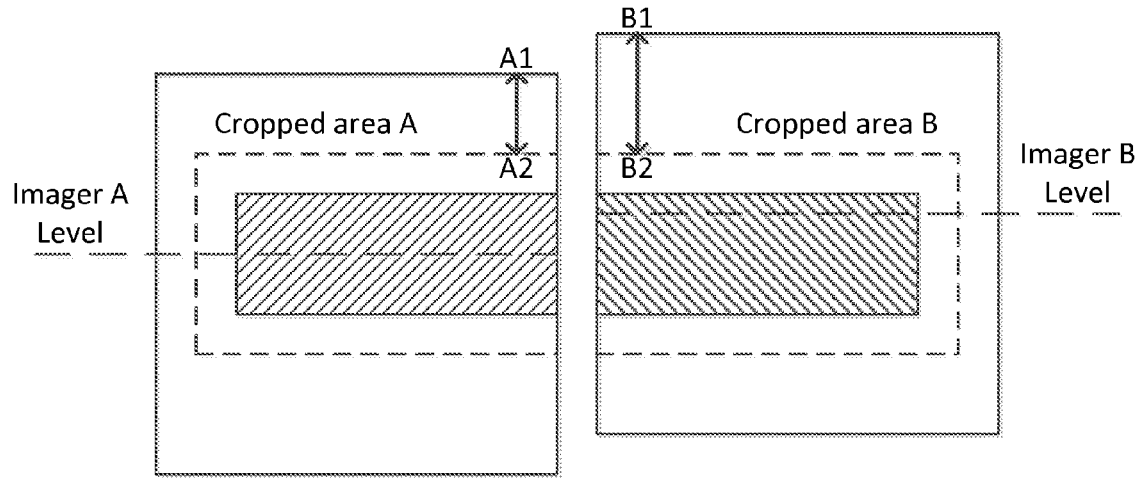

FIGS. 5A-5B are schematic diagrams illustrating the sampling operation of the disclosure used to crop an in-situ image to eliminate an offset artifact in the in-situ image, in accordance with some exemplary embodiments. Referring to FIG. 5A, two in-situ images, referred to as in-situ image A and in-situ image B, are generated by two respective imagers or cameras 102, referred to as imager A and imager B, respectively. It is noted by reference to FIG. 5A that the in-situ images A and B are offset with respect to their respective center lines due to misalignment of their respective imagers. That is, imager A on the left produces in-situ image A which contains the left side of an object, which is aligned at the center of in-situ image A. Imager B on the right produces in-situ image B, which contains the right side of the object, which is offset toward the lower portion of the in-situ image B. As noted above, the offset is caused by misalignment of imager A and imager B. That is, imager A on the left is positioned to be level with the object, but imager B on the right is positioned higher than the object.

FIG. 5B illustrates the use of sampling, according to some exemplary embodiments, to correct for this offset artifact in the composite image. Specifically, according to some exemplary embodiments, by selective sampling of the in-situ images, cropping of the in-situ images is adjusted such that the offset artifact in the in-situ images A and B is eliminated. Referring to FIG. 5B, in in-situ image A, normal cropping is employed, since the image of the object is centered in in-situ image A. Accordingly, when sampling in-situ image A, sampling block 122 is controlled by system controller 108 via unit controller 128 to skip a portion, above the area referred to as cropped area A, as indicated by the arrow A1-A2, from the top of in-situ image A before beginning to sample. The cropped area B of in-situ image B is adjusted to eliminate the offset artifact. Specifically, cropped area B is offset toward the lower portion of the in-situ image B, as indicated by the imager level situated toward the upper portion of cropped area B. Compared with the normal cropping mode, the sampling operation for in-situ image B skips a larger portion of in-situ image B, as indicated by the arrow B1-B2, from the top of the in-situ image B before beginning to sample. This adjustment in the sampling to effect cropping to align the images and eliminate offset is commanded by the system controller 108, which, as described above, in some embodiments, provides the commands to sampling block 122 via unit controller 128. In other embodiments, unit controller 128 is not present and system controller 108 provides the commands directly to sampling unit 108.

Figure 5C:
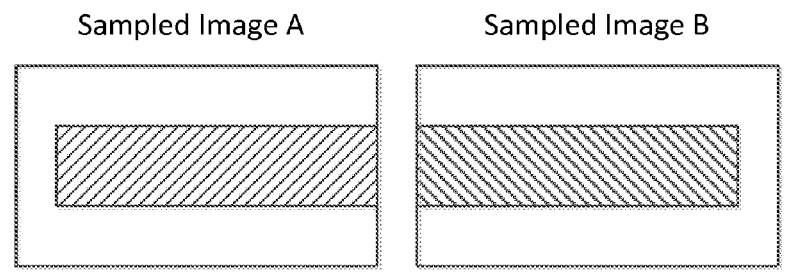
FIG. 5C is a schematic diagram illustrating elimination of an offset artifact in a composite image, according to some exemplary embodiments.

Referring to FIG. 5C, when the two cropped sampled images, sampled image A and sampled image B, are combined to produce a composite image, the offset is eliminated. As illustrated in FIG. 5C, the left and right portions of the image of the object are properly aligned.

In some exemplary embodiments, the sampling operation can be used to correct image distortion. Image distortion may be caused by excessive bending, i.e., convergence or divergence, of the light path, such as, for example, the light path bending caused by a fish-eye lens. According to some exemplary embodiments, the sampling operation corrects image distortion by varying sampling frequencies, with higher sampling frequencies being used in compressed regions of the distorted image and lower sampling frequencies being used in expanded regions.

Figure 6E:
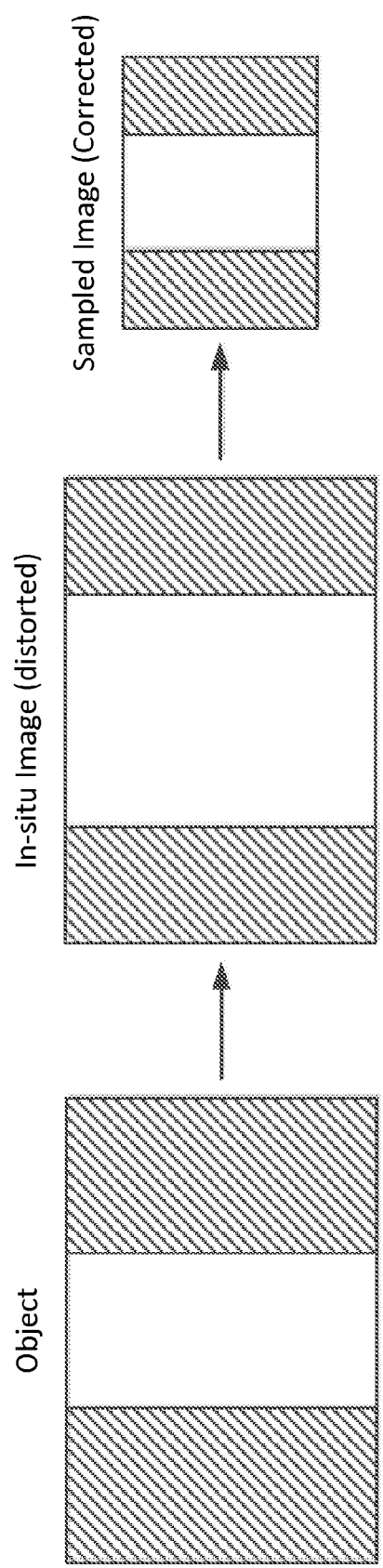
FIGS. 6E-6G illustrate various applications of corrective sampling to correct for distortion in an in-situ image, according to some exemplary embodiments.

FIGS. 6A-6D are schematic diagrams illustrating the sampling operation of the disclosure used to correct image distortion in the in-situ image, in accordance with some exemplary embodiments. FIG. 6A contains a schematic representation of an object to be imaged. Referring to FIG. 6A, the object is represented by a series of vertical lines. A left portion of the object is represented by solid lines, and a right portion of the object is represented by dashed lines. FIG. 6A represents a general ratio of twelve (12) solid lines and seven (7) dashed lines, which are evenly spaced.

FIG. 6B is a schematic representation of an in-situ image of the object of FIG. 6A. Referring to FIG. 6B, it is noted that the in-situ image is distorted. The image includes the twelve solid lines and seven dashed lines, but they are not evenly spaced. Specifically, in the left portion of the image, the line separation distances are compressed, indicating light convergence, and in the right portion of the image, the line separation distances are expanded, indicating light divergence. These distortions may be caused by, for example, the shape of the lens forming the image.

FIGS. 6C and 6D are schematic illustrations which illustrate correction of distortion by sampling, in accordance with some exemplary embodiments. Specifically, in the compressed left portion of the distorted in-situ image, corrective sampling is performed at a higher sampling frequency, i.e., more frequent sampling, and, in the expanded right portion of the distorted in-situ image, corrective sampling is performed at a relatively lower sampling frequency, i.e., less frequent sampling. For example, if sampling is performed on every other line in the left compressed portion of the distorted in-situ image, as indicated by the solid bold lines, and sampling is performed on every third line in the right expanded portion of the distorted in-situ image, as indicated by the dashed bold lines, distortion in the image is corrected, as illustrated in the sampled corrected image in FIG. 6D. Referring to FIG. 6D, the resulting corrected image is free from distortion, such that the lines are evenly spaced. The approximate image appearance is maintained with minimal loss of image data. Specifically, in this illustrative example, an approximate 50% reduction in image size and resolution results, with the corrected image containing six solid lines and three dashed lines.

Figure 6F:
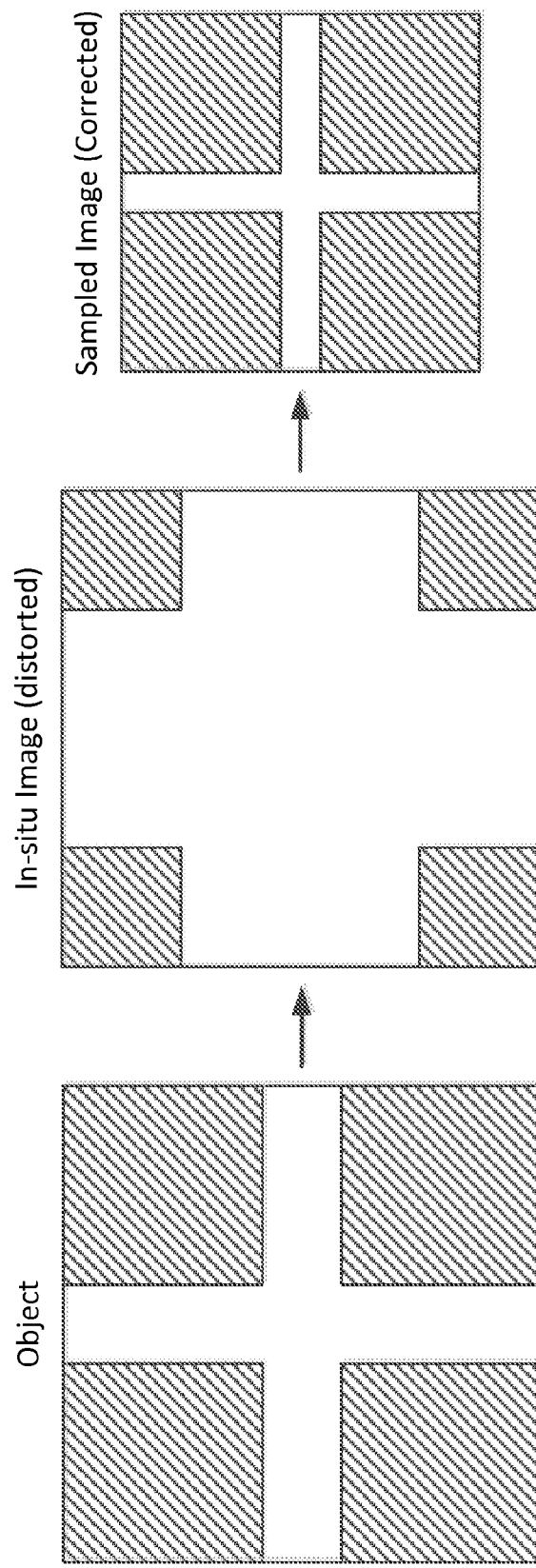
Figure 6G:
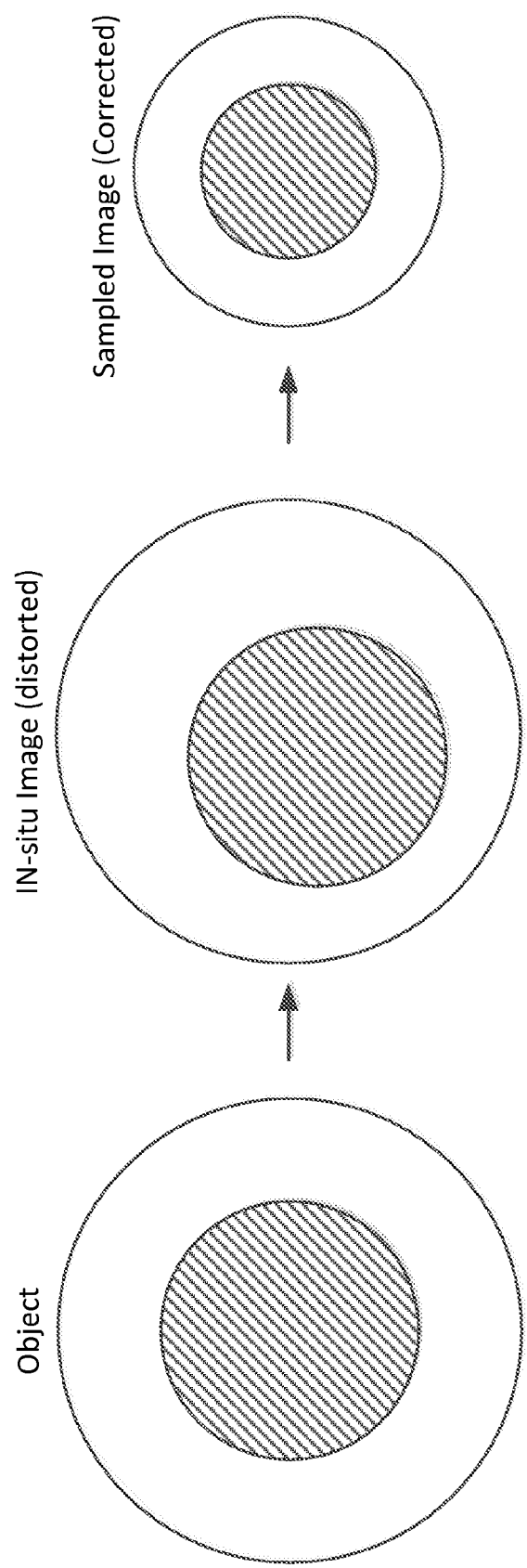

FIGS. 6A-6D illustrate corrective sampling to eliminate spatial distortion by varying sampling frequency in a single spatial dimension. This type of corrective sampling can be applied to correct for distortion in two dimensions of the in-situ image simultaneously, according to some exemplary embodiments. FIGS. 6E-6G illustrate various applications of corrective sampling to correct for distortion in the in-situ image, according to some exemplary embodiments. Referring to FIG. 6E, correction of distortion in a single dimension is illustrated. The first image shows the object, and the second image shows the in-situ image of the object. As shown in the figure, the in-situ image is distorted in one dimension. The third figure shows the corrected image, which has been generated by the selective sampling by varying sampling frequency, described above in detail. Referring to FIG. 6F, correction of distortion in two orthogonal dimensions is illustrated. The first image shows the object, and the second image shows the in-situ image of the object. As shown in the figure, the in-situ image is distorted in two dimensions. The third figure shows the corrected image, which has been generated by the selective sampling by varying sampling frequency, described above in detail, in the horizontal and vertical dimensions. Referring to FIG. 6G, correction of off-center distortion in two orthogonal dimensions is illustrated. The first image shows the object, and the second image shows the distorted in-situ image of the object. As shown in the figure, the in-situ image is distorted in two dimensions, with a feature of the object being rendered in the in-situ image as being off-center with respect to the image. The third figure shows the corrected image, which has been generated by the selective sampling by varying sampling frequency, described above in detail, in the horizontal and vertical dimensions, such that the previously off-center feature is centered in the corrected sampled image.

Another artifact corrected in accordance with some exemplary embodiments is slanting in the in-situ image. Slanting is caused by pointing the imager or camera at the object at a skewed angle. According to some exemplary embodiments, slanting can be corrected or mitigated by selective sampling and/or positioning.

Figure 7A:
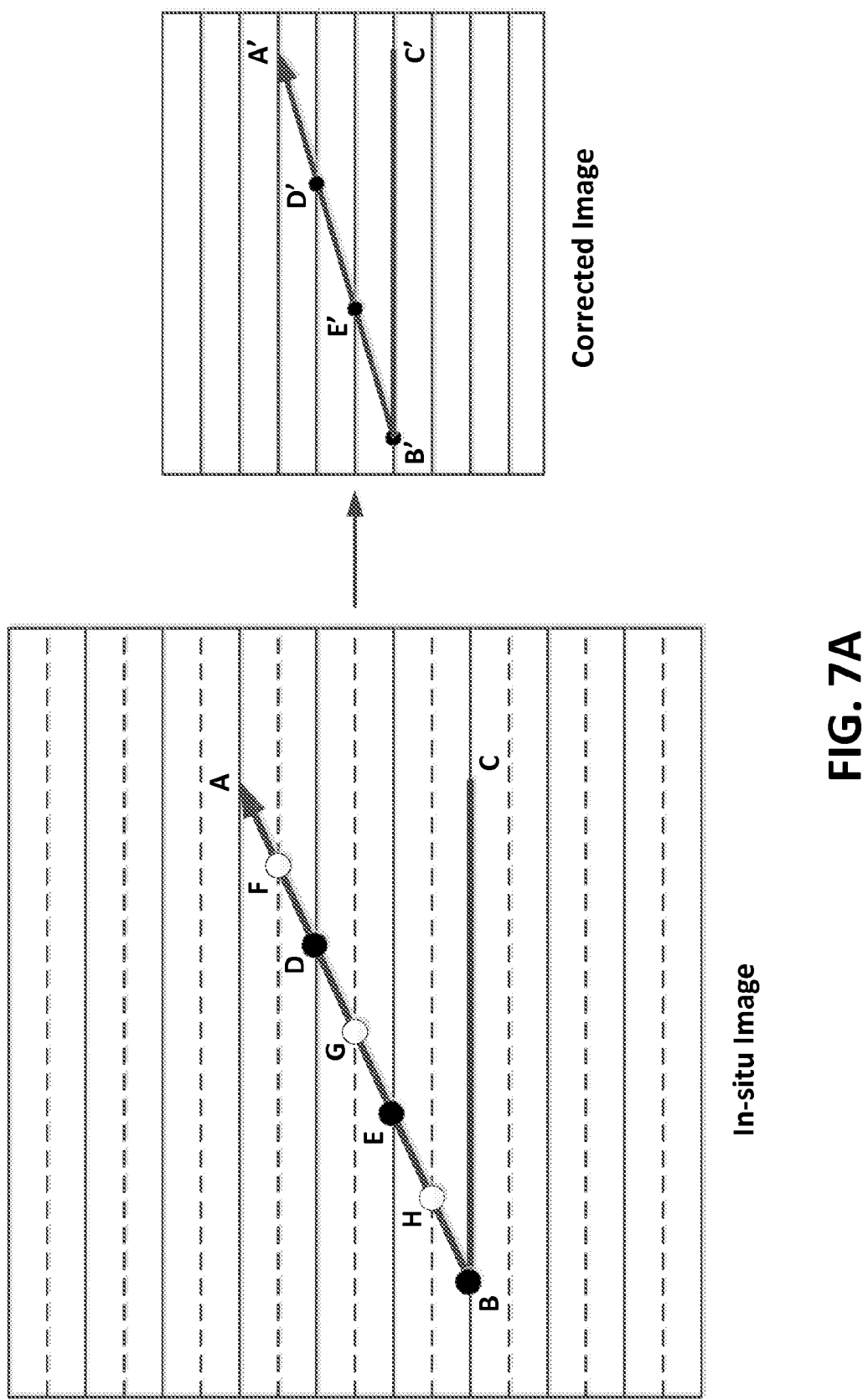
FIG. 7A is a schematic diagram illustrating correction of a slanting artifact in an in-situ image by sampling, according to some exemplary embodiments.

FIG. 7A contains a schematic diagram illustrating correction of a slanting artifact in the in-situ image by sampling, according to some exemplary embodiments. Referring to FIG. 7A, an object, referred to herein as AB, is slanted away from a reference line BC, defining a slanting angle ABC. According to some exemplary embodiments, the slanting artifact is corrected by reducing the slanting angle ABC. Angle reduction can be realized by selectively sampling certain rows and/or columns, while skipping other rows and/or columns.

Referring to FIG. 7A, the distorted in-situ image with the slanting artifact is illustrated in the figure on the left. According to some exemplary embodiments, to correct for the slanting artifact, in row sampling, every other row is sampled. For example, the rows indicated by solid lines in the figure can be sampled, while the rows indicated by dashed lines can be skipped. Of the points in slanted object AB, only points A, D, E and B are sampled, to produce points A', D', E' and B' in the corrected sampled image illustrated on the right side of FIG. 7A. Points F, G and H in the in-situ image are skipped. In the resulting sampled image on the right side of FIG. 7A, object A'B' includes only sampled points A', D', E', and B'. Reference line B'C' remains a horizontal reference line. Slanting angle A'B'C' in the corrected sampled image is smaller than slanting angle ABC in the in-situ image, such that the slanting artifact is at least partially reduced. In the illustrated example, skipping every other row reduces the vertical height of the object, thus, A'C'=½ AC. No skipping in the column renders B'C'=BC. The angle reduction factor for this exemplary illustrative embodiment can be computed by:

Angle reduction factor=angle $A'B'C'$/angle $ABC$=arctan($x/2$)/arctan($x$), where x=length (AC)/length (BC).

If the sampling operation includes skipping both rows and columns, then the slanting angle A'B 'C' may be made to vary, by manipulating the frequency of the skipping of rows and columns. For example, where A'C'=½ AC (by skipping rows) and B'C'=⅔ BC (by skipping columns), then the angle reduction factor=arctan(3x/4)/arctan(x). This is less angle correction than the illustration described above in which the angle reduction factor was arctan(x/2)/arctan(x). It is also noted that object A'B' is further away from reference line B'C' than in the previous illustration. In another example, A'C'=⅓ AC (by skipping rows) and B'C'=⅚ BC (by skipping columns), the angle reduction factor=arctan(2x/5)/arctan(x). This is more angle correction than the previous illustration in which the angle reduction factor was arctan (x/2)/arctan(x). In this illustration, object A'B' is closer to reference line B'C'.

Figure 7B:
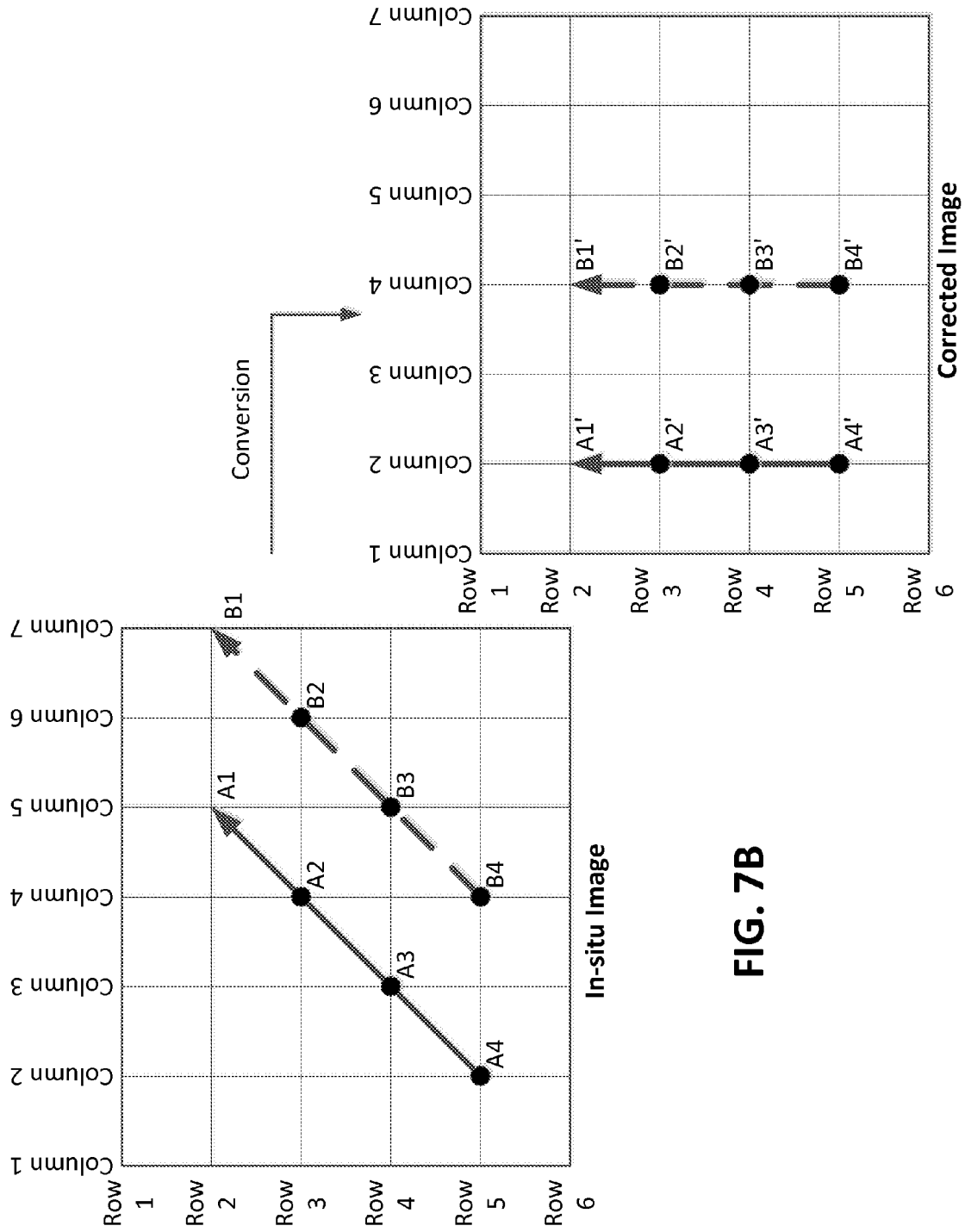
FIG. 7B is a schematic diagram illustrating correction of a slanting artifact in an in-situ image by a sampling or positioning operation to correct the slanting artifact via coordinate conversion, according to some exemplary embodiments.

As noted above, according to some exemplary embodiments, slanting can be corrected or mitigated by selective sampling and/or positioning. FIG. 7B contains a schematic diagram illustrating correction of a slanting artifact in the in-situ image by a sampling or positioning operation to correct the slanting artifact via rotation or coordinate conversion, according to some exemplary embodiments.

Referring to FIG. 7B, objects A1-A4 and B1-B4 in the in-situ image are slanted away from the vertical direction at a 45-degree angle. As illustrated in the corrected image, to correct the in-situ image, point A1 is transformed to point A1', point A2 is transformed to point A2', point A3 is transformed to point A3', point A4 is transformed to point A4', point B1 is transformed to point B1', point B2 is transformed to point B2', point B3 is transformed to point B3' and point B4 is transformed to point B4'.

According to exemplary embodiments, the correction of slanting illustrated in FIG. 7B can be corrected in either sampling block 122 or positioning block 124. According to some embodiments, the correction is performed by reading from the in-situ image a sampled point, e.g., point A1 at row 2 column 5 or coordinate pair (2, 5), and applying a conversion command to the coordinate pair to alter/convert the coordinate pair. For example, in the illustrated exemplary embodiment, the coordinate pair for A1 (2, 5) is converted to (2, 2), which is the coordinate pair for A1'. To generate the corrected sampled image using the sampling block or the corrected repositioned image using the positioning block, the converted coordinate pair (2, 2) is used for point A1'. Similarly, A2 (3, 4) converts to A2' (3, 2), A3 (4, 3) converts to A3' (4, 2), and A4 (5, 2) remains as A4' (5, 2). The result of this coordinate conversion is the rotation of the slanted object A1-A4 in the in-situ image to produce a straight object A1'-A4' in the corrected sampled or repositioned image.

The same coordinate conversion operation can be applied to object B1-B4. Under the coordinate conversion operation, B1 (2, 7) converts to B1' (2, 4), B2 (3, 6) converts to B2' (3, 4), B3 (4, 5) converts to B3' (4, 4), and B4 (5, 4) remains as B4' (5, 4).

Under this conversion operation, the only effect on the in-situ image is the rotation of the objects. The spatial relationships among objects, such as a distance between them, are unchanged by the rotation conversion. In some exemplary embodiments, the conversion is capable of rotating an object to any desired angle. Rotation angles can be multiples of 90 degrees, as described in detail below in connection with generation of a composite perimeter image.

Figure 8:
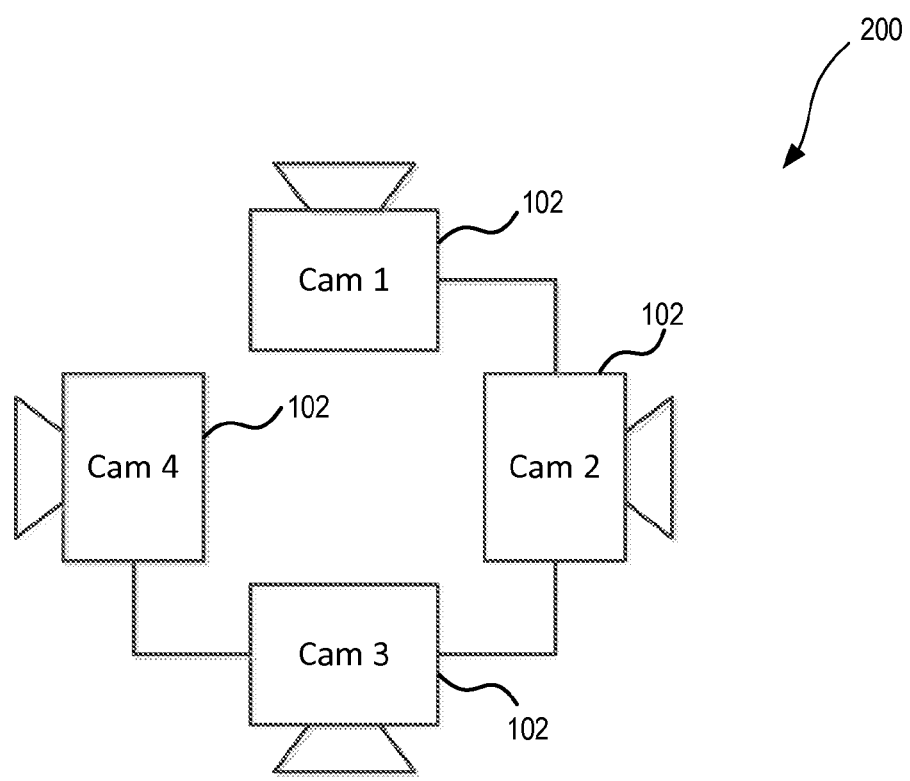
FIG. 8 is a schematic diagram illustrating a system of imagers or cameras for producing a composite perimeter image, according to some exemplary embodiments.

FIG. 8 contains a schematic diagram illustrating a system 200 of imagers or cameras 102 for producing a composite perimeter image, in accordance with some exemplary embodiments. In this system 200, each camera 102 covers, i.e., produces an image of, one direction. For example, in the illustrated embodiment, Cam 1 covers north, Cam 2 covers east, Cam 3 covers south, and Cam 4 covers west. Imagers or cameras 102 are connected in a serial chain, i.e., in series, as described above in detail.

The system 200 of FIG. 8 can be used, for example, for perimeter imaging, such as that used, for example, in surveillance imaging around an automobile. In such a system, in accordance with the foregoing detailed description, each camera 102 obtains an in-situ image in a different direction. Each in-situ image may be cropped and rotated as described above in detail. The resulting corrected sampled images are stitched together to produce the composite perimeter image.

Figure 9:
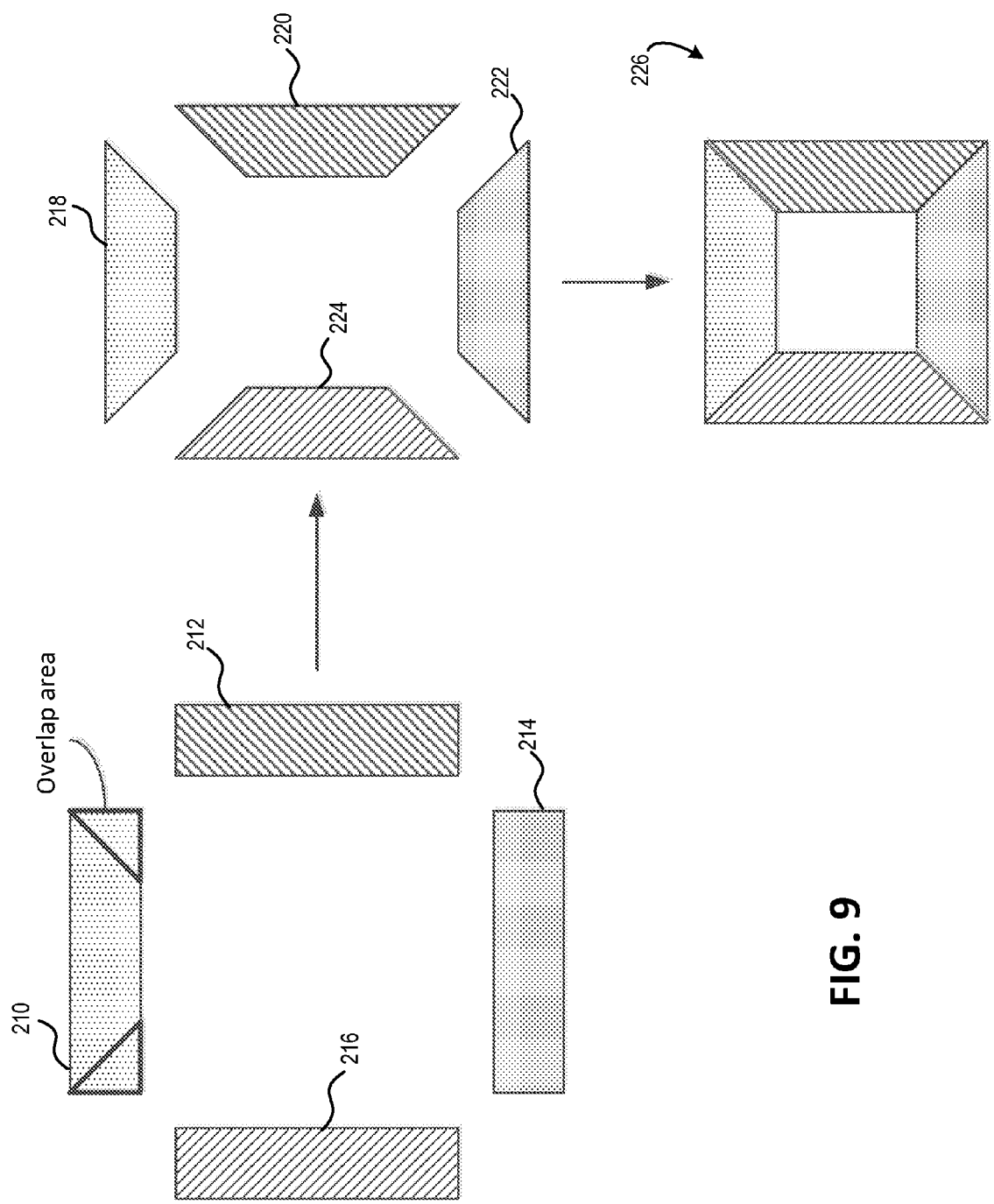
FIG. 9 are schematic illustrations of processing of in-situ images north, east, south, and west, to produce a composite perimeter image, according to some exemplary embodiments.

FIG. 9 contains schematic illustrations of processing of in-situ images north 210, east 212, south 214, and west 216 to produce a composite perimeter image 226, in accordance with some exemplary embodiments. Referring to FIG. 9, each in-situ image 210, 212, 214, 216 is cropped to eliminate overlap areas, as shown, for example, in the north in-situ image 210. It will be understood that all of the in-situ images 210, 212, 214, 216 include such overlap areas that are cropped, according to some exemplary embodiments. Each in-situ image 210, 212, 214, 216 is also rotated into the proper orientation for inclusion in composite perimeter image 226. The properly cropped and rotated images 218, 220, 222, 224 are assembled to produce the final composite perimeter image 226.

Figure 9A:
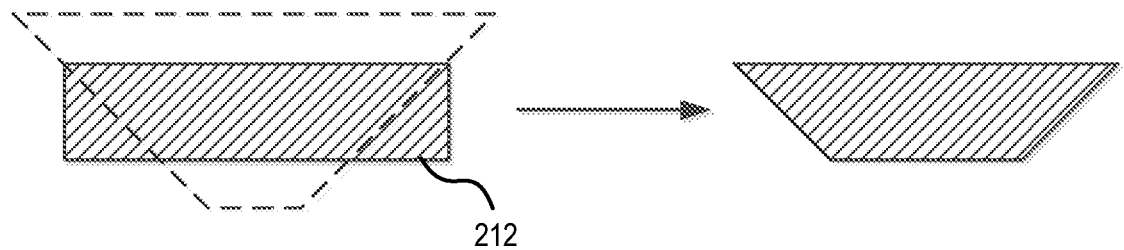
FIGS. 9A and 9B are schematic illustrations of sampling and/or positioning operations carried out on one of the in-situ images illustrated in FIG. 9.
Figure 9B:
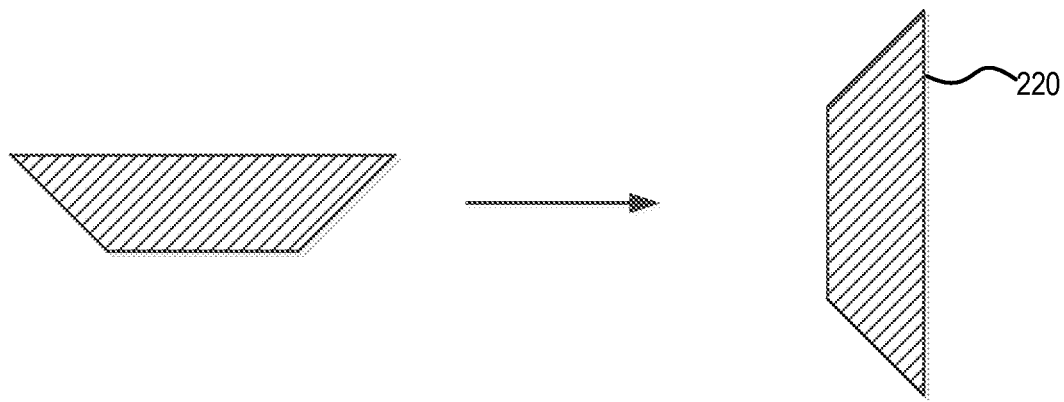

FIGS. 9A and 9B contain schematic illustrations of sampling and/or positioning operations carried out on one of the in-situ images illustrated in FIG. 9. In FIGS. 9A and 9B, the east in-situ image 212/220 is used as an illustrative example. It will be understood that the disclosure is applicable to all of the in-situ images 210, 212, 214, 216. Referring to FIG. 9A, the raw east in-situ image 212 is obtained, and overlap areas are identified. Next, each in-situ image 212 is cropped to eliminate the overlap areas from the image data. The data outside of the dashed lines, representing the overlap areas, are discarded, such that the cropped image is generated. Next, referring to FIG. 9B, the cropped east image is rotated to produce a properly oriented cropped east image 220. In this particular exemplary illustration, the rotation is 90 degrees clockwise. The rotation operation can be performed by sampling, including skipping rows and/or columns, or by conversion of coordinates, as illustrated and described above in detail in connection with FIGS. 7A and 7B. As described herein, the rotation may be carried out by sampling block 122 or positioning block 124.

FIGS. 10A-10G contain schematic illustrations of generation of composite perimeter image 226, according to some exemplary embodiments. Each of FIGS. 10A-10G illustrates an imager or camera 102 (or 102A) as described herein in detail. Each camera 102 receives a composite image from an upstream imager or camera 102, or from a null composite image generator 211, at composite image input end 116, receives an in-situ image at in-situ image input end 118 and outputs an updated composite image to the next downstream imager or camera 102 at composite image output end 120. Each camera 102 includes sampling block 122, positioning block 124 and composition block 126, described herein in detail. Each camera1 is also illustrated as including unit controller 128, which receives signals from system controller 108, as described above in detail. It is understood that the unit controller 128 is optional and that system controller 108 may provide control signals directly to sampling block 122, positioning block 124 and/or composition block 126, as described above in detail.

Figure 10A:
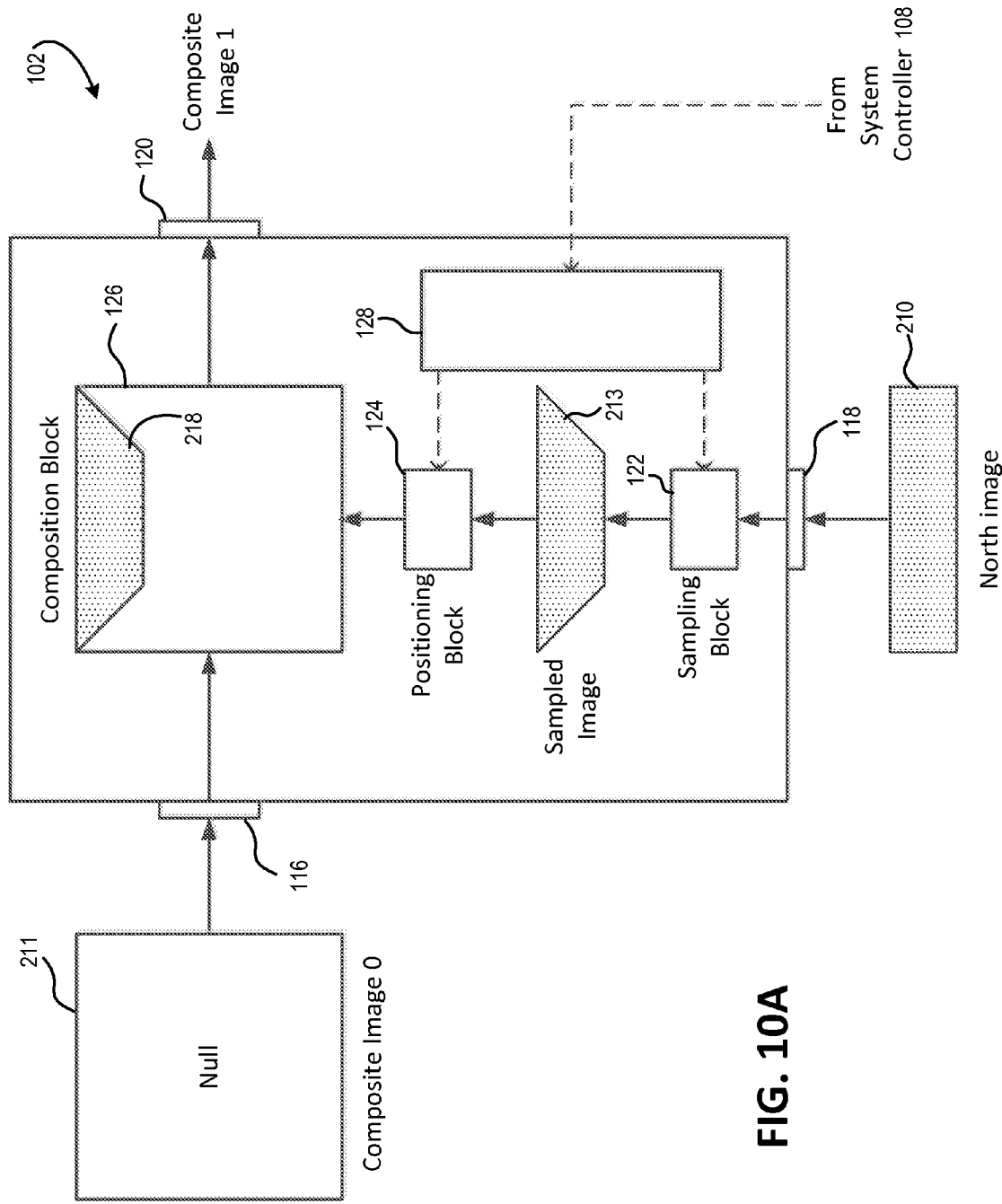
FIGS. 10A-10G are schematic illustrations of generation of a composite perimeter image 226, according to some exemplary embodiments.

Referring to FIG. 10A, north in-situ image 210 is received. Sampling block 122 samples north in-situ image 210 to north crop in-situ image 210 to remove overlap areas to produce a sampled image 213. Sampled image 213 is received by positioning block 124, which assigns the north position to sampled image 213. Composition block 126 inserts sampled image 213 into the northern portion of null composite image 211 to produce composite image 1, which is forwarded to the next downstream camera 102.

Figure 10B:
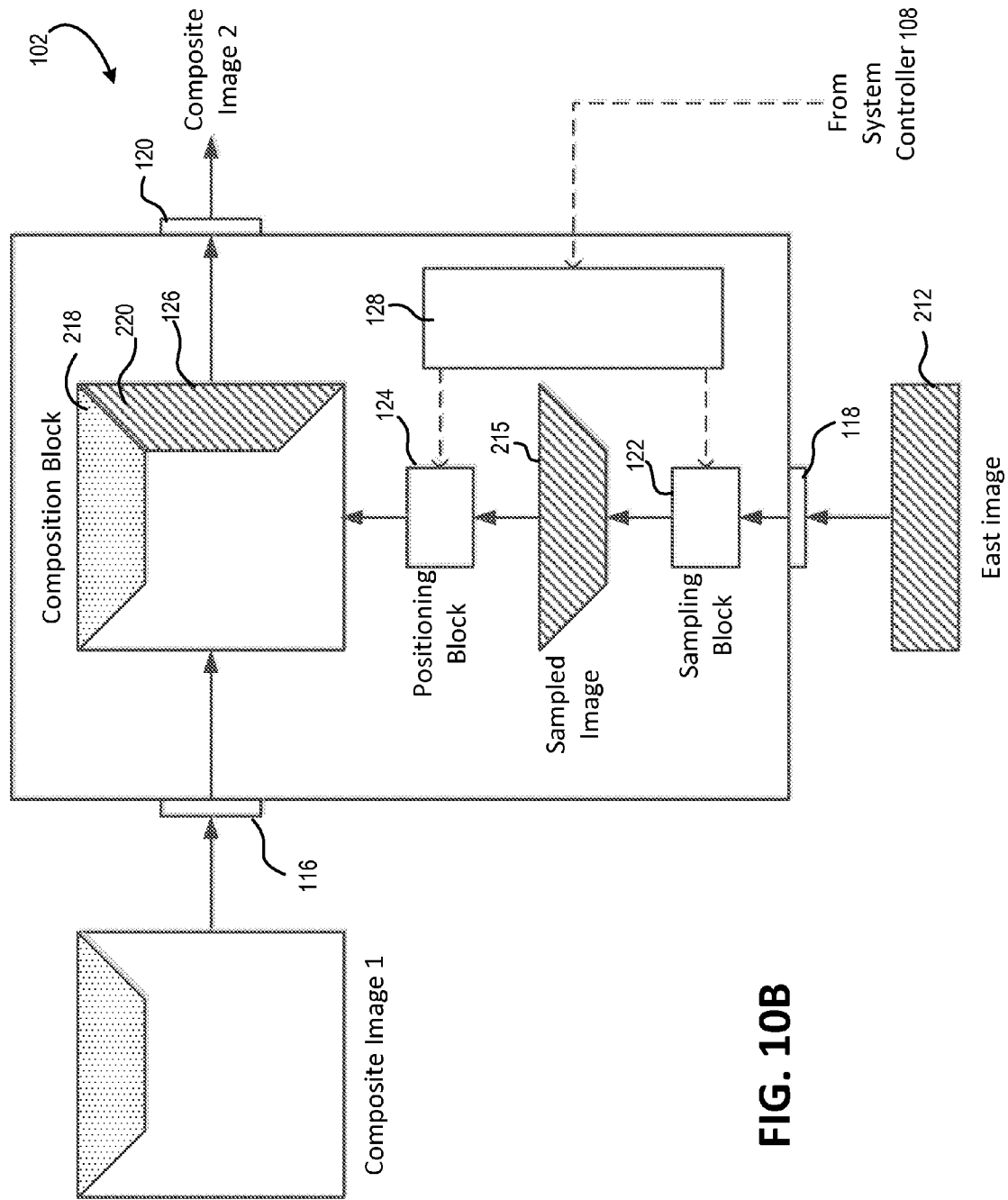

Referring to FIG. 10B, composite image 1 is received by the next downstream camera 102, which also receives the east in-situ image 212. Sampling block 122 samples east in-situ image 212 to crop east in-situ image 212 to remove overlap areas to produce a sampled image 215. Positioning block 124 receives sampled image 215 and rotates sampled image 215 90 degrees clockwise into the eastern orientation. Positioning block 124 also assigns the east position within the composite image to rotated and sampled image 220. Composition block 126 inserts rotated and sampled image 220 into the east position of composite image 1 to generate composite image 2, which is forwarded to the next downstream camera 102.

Figure 10C:
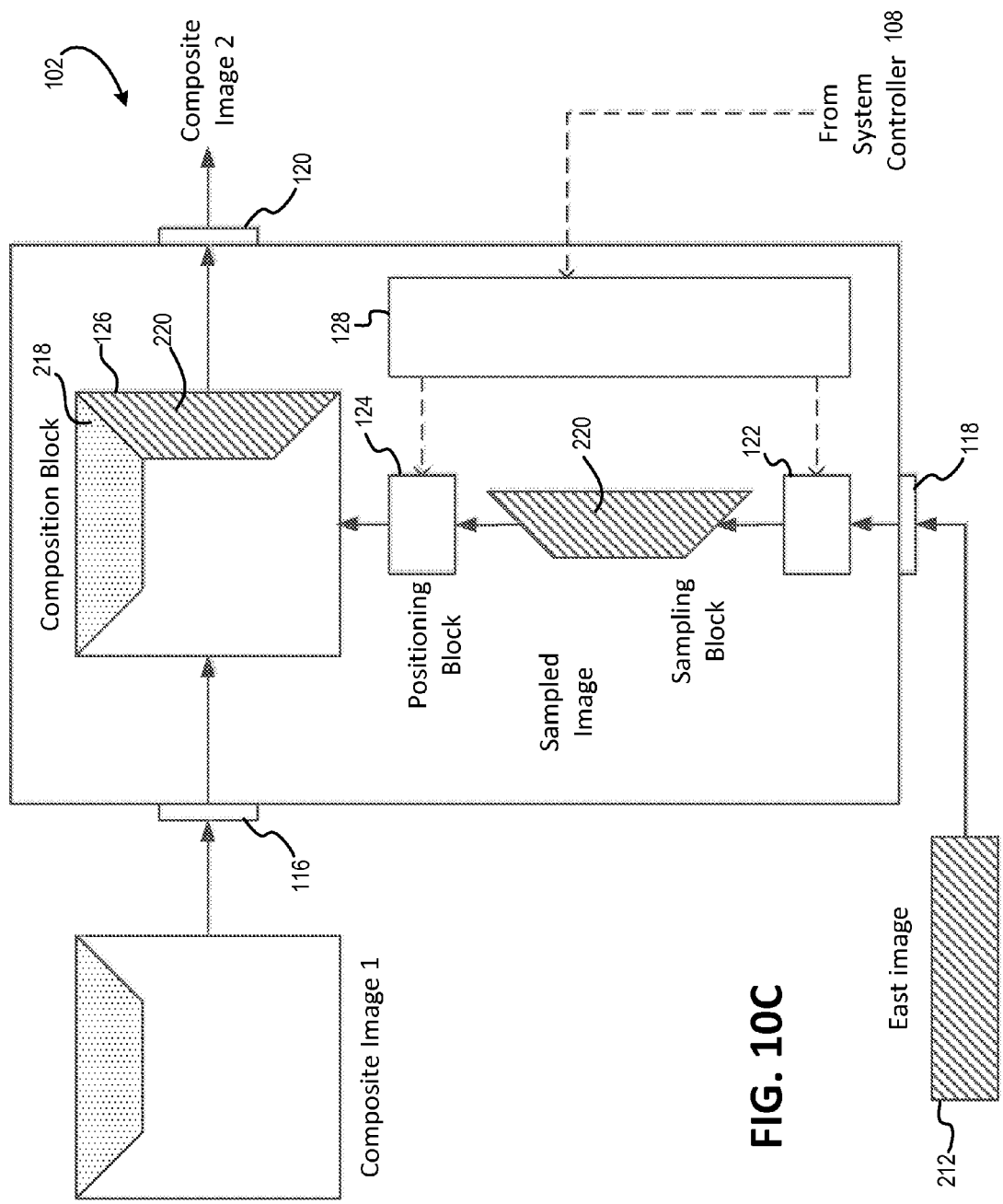

FIG. 10C illustrates an alternative to the processing illustrated in FIG. 10B. Specifically, FIG. 10C illustrates an embodiment in which both the cropping and the rotation of east in-situ image 212 are performed by sampling block 122. That is, in one operation, sampling block 122 crops east in-situ image 212 as described above to remove overlap areas. In another operation, sampling block 122 rotates the sampled image 90 degrees clockwise into the eastern orientation. Positioning block 124 assigns the east position within the composite image to cropped and rotated image 220, without performing the rotation. Composition block 126 inserts rotated and sampled image 220 into the east position of composite image 1 to generate composite image 2, which is forwarded to the next downstream camera 102.

Figure 10D:
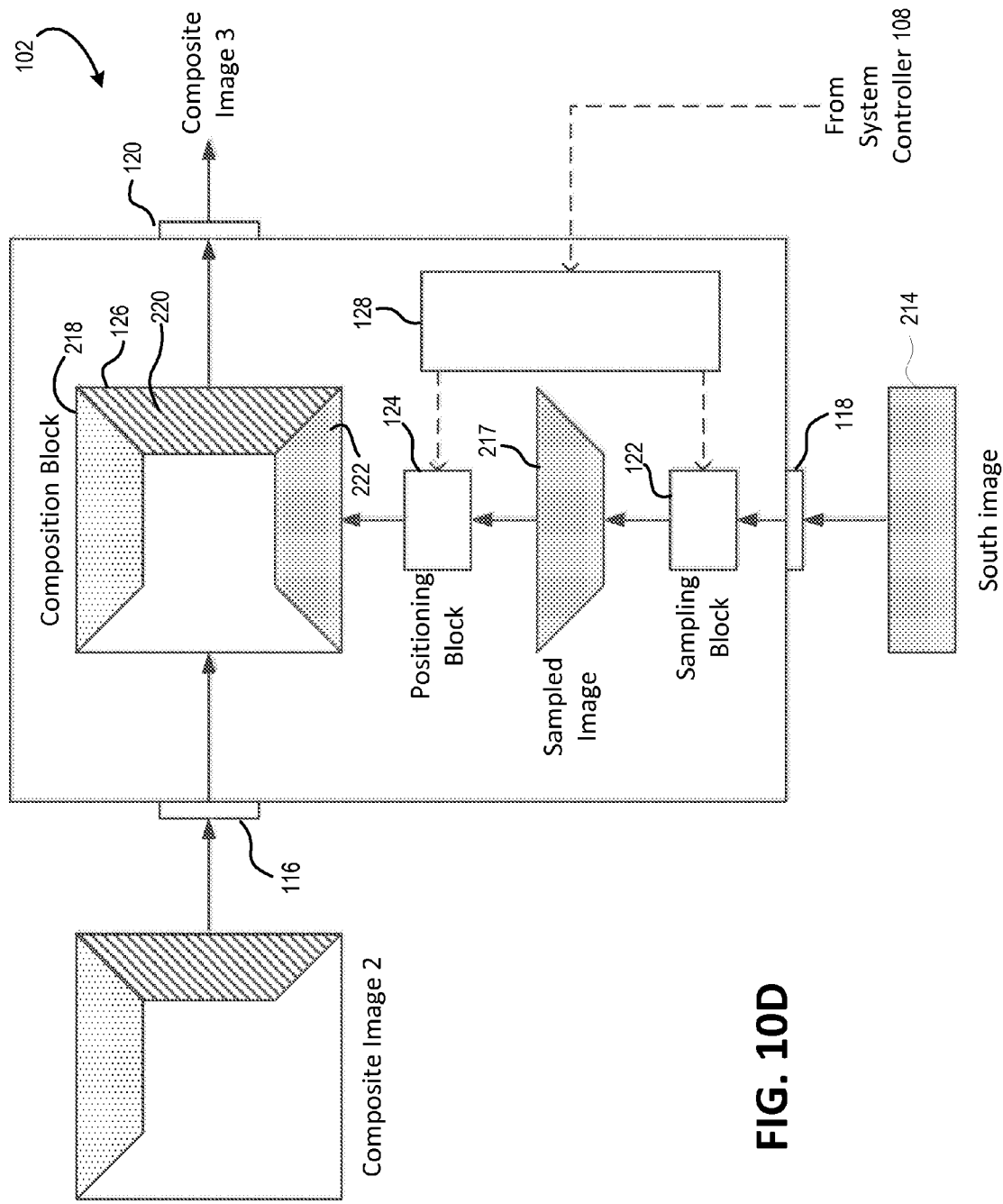

Referring to FIG. 10D, composite image 2 is received by the next downstream camera 102, which also receives the south in-situ image 214. Sampling block 122 samples south in-situ image 214 to crop south in-situ image 214 to remove overlap areas to produce a sampled image 217. Positioning block 124 receives sampled image 217 and rotates sampled image 217 180 degrees into the southern orientation. Positioning block 124 also assigns the south position within the composite image to rotated and sampled image 222. Composition block 126 inserts rotated and sampled image 222 into the south position of composite image 2 to generate composite image 3, which is forwarded to the next downstream camera 102.

Figure 10E:
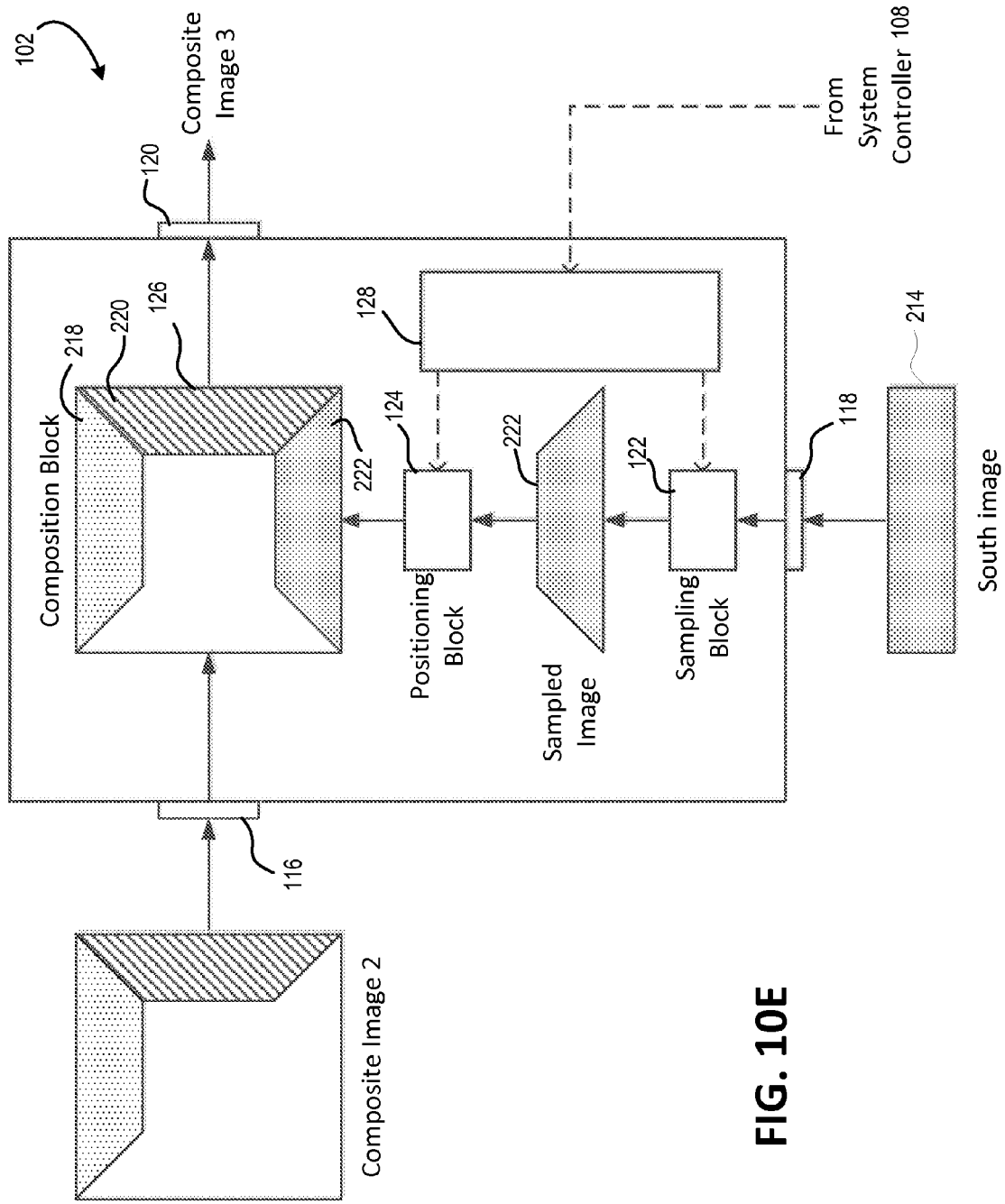

FIG. 10E illustrates an alternative to the processing illustrated in FIG. 10D. Specifically, FIG. 10E illustrates an embodiment in which both the cropping and the rotation of south in-situ image 214 are performed by sampling block 122. That is, in one operation, sampling block 122 crops south in-situ image 214 as described above to remove overlap areas. In another operation, sampling block 122 rotates the sampled image 180 degrees into the southern orientation. Positioning block 124 assigns the south position within the composite image to cropped and rotated image 222, without performing the rotation. Composition block 126 inserts rotated and sampled image 222 into the south position of composite image 2 to generate composite image 3, which is forwarded to the next downstream camera 102.

Figure 10F:
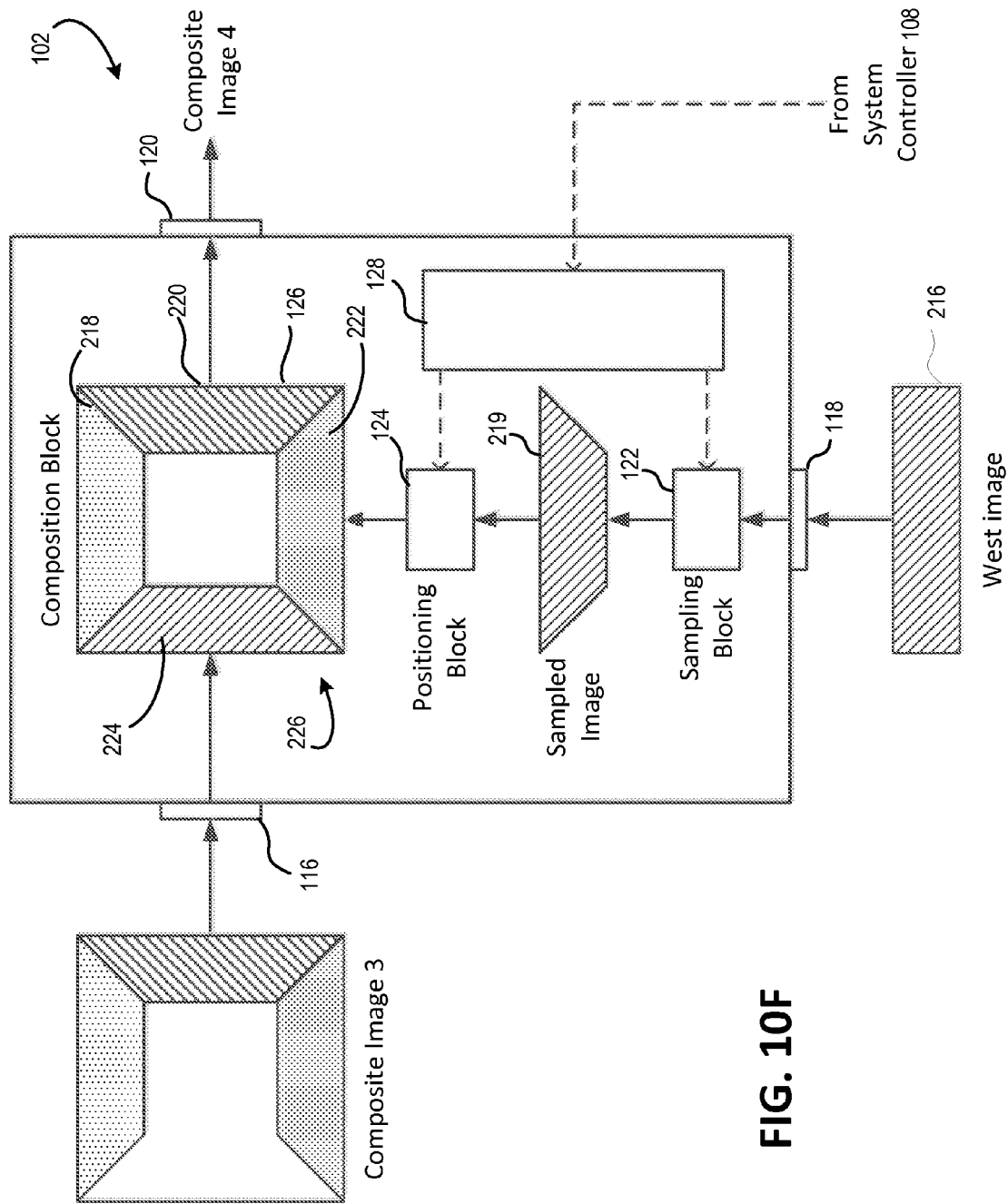

Referring to FIG. 10F, composite image 3 is received by the next downstream camera 102, which also receives the west in-situ image 216. Sampling block 122 samples west in-situ image 216 to crop west in-situ image 216 to remove overlap areas to produce a sampled image 219. Positioning block 124 receives sampled image 219 and rotates sampled image 219 270 degrees clockwise (or 90 degrees counterclockwise) into the western orientation. Positioning block 124 also assigns the west position within the composite image to rotated and sampled image 224. Composition block 126 inserts rotated and sampled image 224 into the west position of composite image 3 to generate the completed composite image 4, which is forwarded for further processing, such as storage and/or display.

Figure 10G:
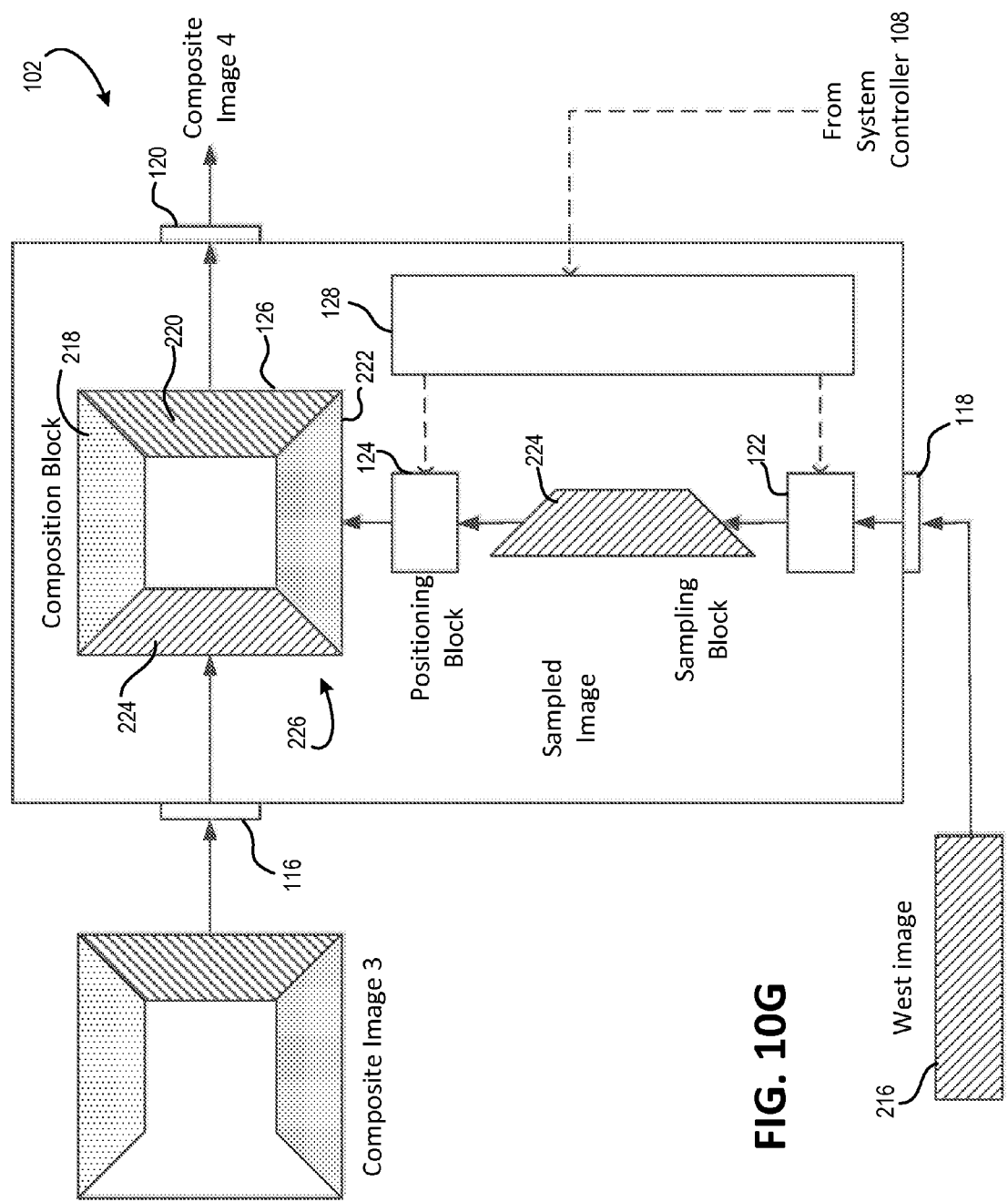

FIG. 10G illustrates an alternative to the processing illustrated in FIG. 10F. Specifically, FIG. 10G illustrates an embodiment in which both the cropping and the rotation of west in-situ image 216 are performed by sampling block 122. That is, in one operation, sampling block 122 crops west in-situ image 216 as described above to remove overlap areas. In another operation, sampling block 122 rotates the sampled image 270 degrees clockwise (or 90 degrees counter-clockwise) into the western orientation. Positioning block 124 assigns the west position within the composite image to cropped and rotated image 224, without performing the rotation. Composition block 126 inserts rotated and sampled image 224 into the west position of composite image 3 to generate composite image 4, which is forwarded for further processing, such as storage and/or display.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, the plurality of imaging units can be coupled together in series.

In any of the embodiments described in detail and/or claimed herein, a second input receives the first composite image.

In any of the embodiments described in detail and/or claimed herein, the first composite image is generated by the imaging unit.

In any of the embodiments described in detail and/or claimed herein, each imaging unit further comprises a sampling unit that samples the in-situ image to generate a sampled image.

In any of the embodiments described in detail and/or claimed herein, the sampling unit samples a first portion of the in-situ image at a first sampling frequency and samples a second portion of the in-situ image at a second sampling frequency, the first and second sampling frequencies being different such that distortion in the in-situ image is reduced.

In any of the embodiments described in detail and/or claimed herein, when one of the first and second portions of the in-situ image is relatively compressed, a relatively higher sampling frequency is used in sampling the one of the first and second portions of the in-situ image.

In any of the embodiments described in detail and/or claimed herein, when one of the first and second portions of the in-situ image is relatively expanded, a relatively lower sampling frequency is used in sampling the one of the first and second portions of the in-situ image.

In any of the embodiments described in detail and/or claimed herein, the sampling unit samples the in-situ image such that the in-situ image is cropped.

In any of the embodiments described in detail and/or claimed herein, the sampling unit crops the in-situ image by skipping sampling for at least one portion of the in-situ image.

In any of the embodiments described in detail and/or claimed herein, the sampling unit crops the in-situ image to correct for an image offset artifact.

In any of the embodiments described in detail and/or claimed herein, the sampling unit samples the in-situ image such that the in-situ image is rotated.

In any of the embodiments described in detail and/or claimed herein, the sampling unit samples the in-situ image such that a slanting artifact in the in-situ image is reduced.

In any of the embodiments described in detail and/or claimed herein, the sampling unit reduces the slanting artifact by skipping sampling in at least one portion of the in-situ image that contains the slanting artifact.

In any of the embodiments described in detail and/or claimed herein, the sampling unit reduces the slanting artifact by converting coordinates of sampled data points in at least one portion of the in-situ image that contains the slanting artifact.

In any of the embodiments described in detail and/or claimed herein, the sampling unit samples only preselected rows of the in-situ image and discards nonselected rows of the in-situ image.

In any of the embodiments described in detail and/or claimed herein, the sampling unit samples only preselected columns of the in-situ image and discards nonselected columns of the in-situ image.

In any of the embodiments described in detail and/or claimed herein, each imaging unit further comprises a positioning unit that assigns a position of the sampled image within the second composite image.

In any of the embodiments described in detail and/or claimed herein, the positioning unit rotates the sampled image to a proper orientation.

In any of the embodiments described in detail and/or claimed herein, each imaging unit further comprises a unit controller which receives the at least one signal from the system controller to control at least one of the sampling unit and the positioning unit, and/or a composition unit.

While the present disclosure makes reference to exemplary embodiments, it will be understood by those of ordinary skill in the art that various changes in form and details may be made therein without departing from the spirit and scope of the present disclosure.

We claim:

1. An imaging system for providing an extended-view image, comprising:
    a plurality of cameras coupled in series for transmitting image data through the series to serially compose, within the cameras, the extended-view image from each of a plurality of in-situ images captured by the plurality of cameras, respectively, each of the cameras including:
        (a) an image sensing unit for generating a respective one of the plurality of in-situ images, and
        (b) an image data processing unit configured to combine the respective one of the plurality of in-situ images with a first composite image to produce a second composite image that, for each of the cameras except last camera in the series, is utilized by next camera in the series as the first composite image.

2. The imaging system of claim 1, the second composite image produced by the last camera being the extended-view image.

3. The imaging system of claim 1, further comprising in each of the cameras:
    an input end for receiving the first composite image; and
    an output end for outputting the second composite image, the output end of each of the cameras, except the last camera, being coupled with the input end of the next camera so as to transmit the second composite image to the input end of next camera where the second composite image is received as the first composite image of the next camera.

4. The imaging system of claim 3, for first camera in the series, the first composite image being a null image.

5. The imaging system of claim 1, in each of the cameras, the image data processing unit comprising:
    a sampling block configured to sample the respective one of the plurality of in-situ images to generate a sampled image therefrom;
    a positioning block configured to assign position of the sampled image within the second composite image; and
    a composition block configured to combine the sampled image with the first composite image according to the position assigned by the positioning block.

6. The imaging system of claim 5, the sampling block being configured for correcting an artifact of the respective one of the plurality of in-situ images such that the artifact is not present in the sampled image.

7. The imaging system of claim 5, the sampling block being configured for sampling the respective one of the plurality of in-situ images such that the sampled image is rotated relative to the respective one of the plurality of in-situ images.

8. The imaging system of claim 7, the sampling block further being configured for removing portions of the respective one of the plurality of in-situ images that otherwise would overlap, in the extended-view image, with a portion of at least one other image contributing to the extended-view image.

9. The imaging system of claim 1,
    each camera in the series, except for a first camera in the series, being adapted to (a) receive a first extended-view image from its immediate predecessor camera in the series and (b) incorporate its in-situ image into the first extended-view image to construct a second extended-view image; and
    each camera in the series, except for a last camera in the series, being adapted to transmit the second extended-view image to its immediate successor camera in the series.

10. A method for generating an extended-view image using a plurality of cameras coupled in series, the method comprising:
    in each of the cameras, generating a respective one of a plurality of in-situ images; and
    in each of the cameras, combining the respective one of the plurality of in-situ images with a first composite image to produce a second composite image that, for each of the cameras except last camera in the series, is utilized by next camera in the series as the first composite image, so as to serially compose, within the cameras, the extended-view image from each of a plurality of in-situ images.

11. The method of claim 10, further comprising, in first camera in the series, using a null-image as the first composite image.

12. The method of claim 10, further comprising:
    in each of the cameras except the last camera, outputting the second composite image to the next camera; and
    in the last camera, outputting the second composite image as the extended-view image.

13. The method of claim 10, in each of the cameras, the step of combining comprising:
    sampling the respective one of the plurality of in-situ images to generate a sampled image; and
    assigning, to the sampled image, position of the sampled image within the second composite image; and
    placing the sampled image in the second composite image at said position.

14. The method of claim 13, the step of sampling comprising correcting an artifact of the respective one of the plurality of in-situ images such that the artifact is not present in the sampled image.

15. The method of claim 13, the step of sampling comprising sampling the respective one of the plurality of in-situ images such that the sampled image is rotated relative to the respective one of the plurality of in-situ images.

16. The imaging system of claim 15, the step of sampling comprising removing portions of the respective one of the plurality of in-situ images that otherwise would overlap, in the extended-view image, with a portion of at least one other image contributing to the extended-view image.

* * * * *